United States Patent
Takahashi et al.

(10) Patent No.: US 10,223,304 B2
(45) Date of Patent: Mar. 5, 2019

(54) SEMICONDUCTOR DEVICE

(71) Applicant: Renesas Electronics Corporation, Kawasaki-shi, Kanagawa (JP)

(72) Inventors: Yasuhiko Takahashi, Kanagawa (JP); Seiji Ikari, Tokyo (JP); Naoki Mitsuishi, Kanagawa (JP)

(73) Assignee: Renesas Electronics Corporation, Tokyo ( * ) Notice: Subject to any disclaimer, the term of this patent is extended or adjusted under 35 U.S.C. 154(b) by 594 days.

(21) Appl. No.: 14/523,867

(22) Filed: Oct. 25, 2014

(65) Prior Publication Data
US 2015/0127867 A1 May 7, 2015

(30) Foreign Application Priority Data
Nov. 7, 2013 (JP) .................................. 2013-230883

(51) Int. Cl.
*G06F 13/24* (2006.01)
*G06F 12/00* (2006.01)
*G06F 15/00* (2006.01)

(52) U.S. Cl.
CPC .............. *G06F 13/24* (2013.01); *Y02D 10/14* (2018.01)

(58) Field of Classification Search
CPC ............................ G06F 13/24; Y02B 60/1228
USPC ........... 710/269; 711/100, 130; 712/33, 222, 712/269
See application file for complete search history.

(56) References Cited

U.S. PATENT DOCUMENTS

| 4,519,028 A | * | 5/1985 | Olsen | ...................... G06F 13/24 712/33 |
| 4,876,639 A | * | 10/1989 | Mensch, Jr. | ........ G06F 9/30174 703/27 |
| 5,809,259 A | | 9/1998 | Mitsuishi | |
| 7,529,890 B1 | * | 5/2009 | Neuman | ............. G06F 11/2236 711/130 |
| 8,001,292 B2 | | 8/2011 | Ohyama | |

(Continued)

FOREIGN PATENT DOCUMENTS

| JP | 01-125644 A | 5/1989 |
| JP | 06-318183 A | 11/1994 |

(Continued)

OTHER PUBLICATIONS

Tang, Jie et al.. "OCP:Offload Co-Processor for Energy Efficiency in Embedded Mobile Systems," 2013 IEEE 24th International Conference on Application-Specific Systems, Architectures and Processors, pp. 107-110. Published Jun. 1, 2013. (Year: 2013).*

(Continued)

*Primary Examiner* — Farley Abad
*Assistant Examiner* — Henry W Yu
(74) *Attorney, Agent, or Firm* — Shapiro, Gabor and Rosenberger, PLLC

(57) ABSTRACT

A microcomputer includes a central processing unit (CPU) and a data transfer controller (DTC). The data transfer controller (DTC) reads out data transfer information including transfer mode information from a storage device (RAM) or the like. The data transfer controller (DTC) analyzes the transfer mode information to change at least one of a transfer source address, a transfer destination address, the number of transfer operations, and data transfer information that is used next.

18 Claims, 17 Drawing Sheets

(56) References Cited

U.S. PATENT DOCUMENTS

| | | | | |
|---|---|---|---|---|
| 2003/0233511 A1* | 12/2003 | Kubo | ................. | G06F 12/0207 |
| | | | | 711/100 |
| 2005/0114113 A1* | 5/2005 | Quayle | .............. | G06F 17/5022 |
| | | | | 703/25 |
| 2009/0113186 A1* | 4/2009 | Kato | ....................... | H03M 7/24 |
| | | | | 712/222 |
| 2010/0023788 A1* | 1/2010 | Scott | .................... | G06F 1/3209 |
| | | | | 713/320 |

FOREIGN PATENT DOCUMENTS

| | | | |
|---|---|---|---|
| JP | 07-129537 | A | 5/1995 |
| JP | H08-137784 | A | 5/1996 |
| JP | 2000-194647 | A | 7/2000 |
| JP | 2005-301665 | A | 10/2005 |
| JP | 2009-157493 | A | 7/2009 |
| JP | 2012-155604 | A | 8/2012 |

OTHER PUBLICATIONS

Ostani, S. et al. "Peach: A Multicore Communication System on Chip with PCI Express," IEEE Micro (vol. 31, Issue: 6, pp. 39-50). Published Nov. 1, 2011. (Year: 2011).*

"LSI Handbook", pp. 540-541, published by Ohmsha Ltd. on Nov. 30, 1984.

Office Action dated Jun. 20, 2017 in Japanese Patent Application No. 2013-230883.

Office Action dated Sep. 4, 2018, in Chinese Patent Application No. 201410642934.5.

\* cited by examiner

| BIT | MR | SAR | DAR | CR | DR |
|---|---|---|---|---|---|
| 0 NXTE0 | | | | | |
| NXTE1 | | | | TCRL | |
| NXTS | | | | | |
| — | | | | | |
| — | | | | | |
| — | | | | | |
| Sz0 | | | | | |
| Sz1 | | | | | |
| — | | | | | |
| DIR | | | | | |
| TDM0 | | | | | |
| TDM1 | | | | TCRH | |
| DM0 | | | | | |
| DM1 | | | | | |
| SM0 | | | | | |
| 15 SM1 | | | | | |
| 16 OP0 | | | | | |
| OP1 | | | | | |
| OP2 | | | | | |
| OP3 | | | | | |
| — | | | | | |
| — | | | | | |
| — | | | | BTCR | |
| SEL | | | | | |
| — | | | | | |
| — | | | | | |
| CLM | | | | | |
| ALM | | | | | |
| SFM | | | | | |
| TSM | | | | | |
| SWM | | | | | |
| 31 ACM | | | | | |

Fig. 4

SEMICONDUCTOR DEVICE

CROSS-REFERENCE TO RELATED APPLICATIONS

This application is based upon and claims the benefit of priority from Japanese patent application No. 2013-230883, filed on Nov. 7, 2013, the disclosure of which is incorporated herein in its entirety by reference.

BACKGROUND

The present invention relates to a semiconductor device, and more specifically, for example, to a semiconductor device including a data transfer function.

A single-chip microcomputer, as described in the "LSI Handbook", pp. 540-541, published by Ohmsha Ltd., on Nov. 30, 1384, generally consists of a central processing unit (CPU) and other functional blocks including a read only memory (ROM) for program storage, a random access memory (RAM) for data storage, and an input/output circuit for input and output of data or signals, with all of these blocks formed on a single semiconductor substrate. The single-chip microcomputer is used to control equipment.

In the control of equipment of the single-chip microcomputer described above, a data transfer may be performed in response to en event such as an interrupt. When the central processing unit (CPU) performs interrupt processing, exception processing, operations of saving to a stack/recovering from a stack, and execution of a recovery instruction are required to switch the process flow. However, the processing of the central processing unit (CPU) requires processing of saving to a stack/recovering from a stack. Further, in the processing of the central processing unit (CPU), a time for an operation such as instruction reading among processing required for the data transfer processing tends to increase.

In view of the problems of the data transfer by the central processing unit (CPU) described above, a technique of providing a data transfer apparatus which is a hardware different from the central processing unit (CPU) in a microcomputer has been suggested. A microcomputer disclosed in Japanese Unexamined Patent Application Publication No. 1-125644 (Hayashi) includes a data transfer apparatus therein. This data transfer apparatus achieves a data transfer in response to a request from a large a under of peripheral processing devices (input/output circuit) with less hardware. The microcomputer disclosed in Hayashi includes a storage device (RAM) that stores data transfer information including a transfer source address indicating the location in a memory which stores data to be transferred. Further, the microcomputer includes a vector table that holds storage addresses in a storage device (RAM) of all the information required for the data transfer. The data transfer apparatus includes means for referring to the vector table upon receiving a data transfer start request, and means for acquiring information required for the data transfer from the vector table. Hayashi mainly teaches performing a data transfer with less hardware and does not teach specific details of the data transfer.

Japanese Unexamined Patent Application Publication No. 2000-194647 (Yamashita) discloses a configuration in which an arithmetic operation unit is provided in a data transfer apparatus. The arithmetic operation unit performs a comparison and a simple arithmetic operation of data that is set in advance and data to be transferred. According to the comparison results of data, the data transfer apparatus does not perform a predetermined number of data transfer operations, and requests a central processing unit (CPU) to execute processing.

A data transfer apparatus disclosed in Japanese Unexamined Patent Application Publication No. 7-129537 (Mitsuishi) executes reading from a storage device storing information required for a data transfer to execute a plurality of successive data transfer operations. This technique is also called a chain transfer. According to this technique, the data transfer apparatus is able to execute an arbitrary number of data transfer operations according to a start factor of the data transfer, and can be used for various applications. Further, due to the chain operation, the flexibility of the whole system can be improved. The data transfer apparatus disclosed by Mitsuishi is able to execute a repeat transfer mode and a data block transfer mode.

As described above, the microcomputer includes a dedicated hardware (data transfer apparatus) that performs a data transfer. It is therefore possible to achieve a high-speed data transfer compared to the case in which the central processing unit (CPU) performs a data transfer. Further, since the data transfer apparatus performs data transfer, the frequency of processing in the central processing unit (CPU) decreases. Since the frequency of the interrupt processing decreases, the overhead of processing such as transition/recovery decreases. This enables the microcomputer to achieve efficient processing. The data transfer apparatus has a logical size smaller than that of the central processing unit (CPU). Accordingly, when the data transfer apparatus performs the data transfer, power consumption can be suppressed compared to the case in which the central processing unit (CPU) performs the data transfer.

In recent years, the number of functions implemented in a microcomputer has been increasing. As the number of functions increases, the number of data transfer operations that should be performed in response to an event such as an interrupt increases as well. Further, when other accompanying operations can be executed at the time of data transfer, the processing efficiency can further be improved. It is therefore required to enhance the functionality of the data transfer apparatus, and to reduce the processing load of the central processing unit (CPU). Related arts regarding the enhancement of the functionality of the data transfer apparatus includes Japanese Unexamined Patent Application Publication No. 6-318183 (Owaki at al.), Japanese Unexamined Patent Application Publication No. 2012-155604 (Matsuzawa), and Japanese Unexamined Patent Application Publication No. 2005-301665 (Azumaya).

Owaki et al., discloses a DMA controller that determines input data input from a first memory using a control signal, processes the data according to the determination, and then writes the processed data into a second memory. Matsuzawa discloses a data transfer control device that performs arithmetic operation processing of transfer data in a DMA transfer between a system memory and a large-capacity memory of a digital camera. Azumaya discloses a data processing apparatus that performs arithmetic operation processing of transfer data when data is transferred from a memory by a DMA method.

SUMMARY

The data transfer information (e.g., transfer source address, transfer destination address, the number of transfer operations) is stored in a storage device (e.g., RAM) by a CPU in advance. It is therefore impossible to dynamically change the data transfer information (e.g., transfer source address, transfer destination address, the number of transfer operations) according to the contents of data transfer. While the data transfer method disclosed in each of Owaki et al., Matsuzawa, and Azumaya performs processing of changing data that is read out by an arithmetic operation to write the changed data into a writing destination, it does not change the data transfer information itself. In summary, the data transfer method disclosed in each of Owaki et al., Matsuzawa, and Azumaya does not consider dynamically changing the transfer source address, the transfer destination address, and the number of transfer operations.

Therefore, the data transfer apparatus stated above cannot process a monitor operation even in a sample polling operation of, for example, "measuring the temperature and when the temperature reaches a predetermined range (temperature), this case is processed as an error". In summary, in order to perform this monitor operation, an interrupt to the central processing unit (CPU) is required each time. Such a monitor operation is extremely frequently performed in the microcomputer. This imposes a large burden on the central processing unit (CPU), which performs operations before and after the data transfer.

Other problems and novel characteristics will be understood from the description of the specification and the accompanying drawings.

According to one embodiment, a data transfer apparatus reads oat a transfer information set including transfer mode information indicating contents of control of a data transfer, and changes, according to an analysis of the transfer mode information, at least one of a transfer source address, a transfer destination address, the number of transfer operations, a transfer information set used for a next data transfer.

According to the embodiment, a data transfer in which the processing load of a central processing unit (CPU) is reduced can be performed.

BRIEF DESCRIPTION OF THE DRAWINGS

The above and other aspects, advantages and features will be more apparent from the following description of certain embodiments taken in conjunction with the accompanying drawings, in which:

FIG. 4 is a diagram showing data transfer information managed by the data transfer controller (DTC) 12 according to the first embodiment;

DETAILED DESCRIPTION

Hereinafter, with reference to the drawings, configurations and operations of a receiver according to an embodiment will be described. For the sake of clarification of the description, the following description and the drawings are partially omitted and simplified. Throughout the drawings, the same components are denoted by the same reference symbols, and the overlapping descriptions will be omitted as appropriate.

Figure 1:
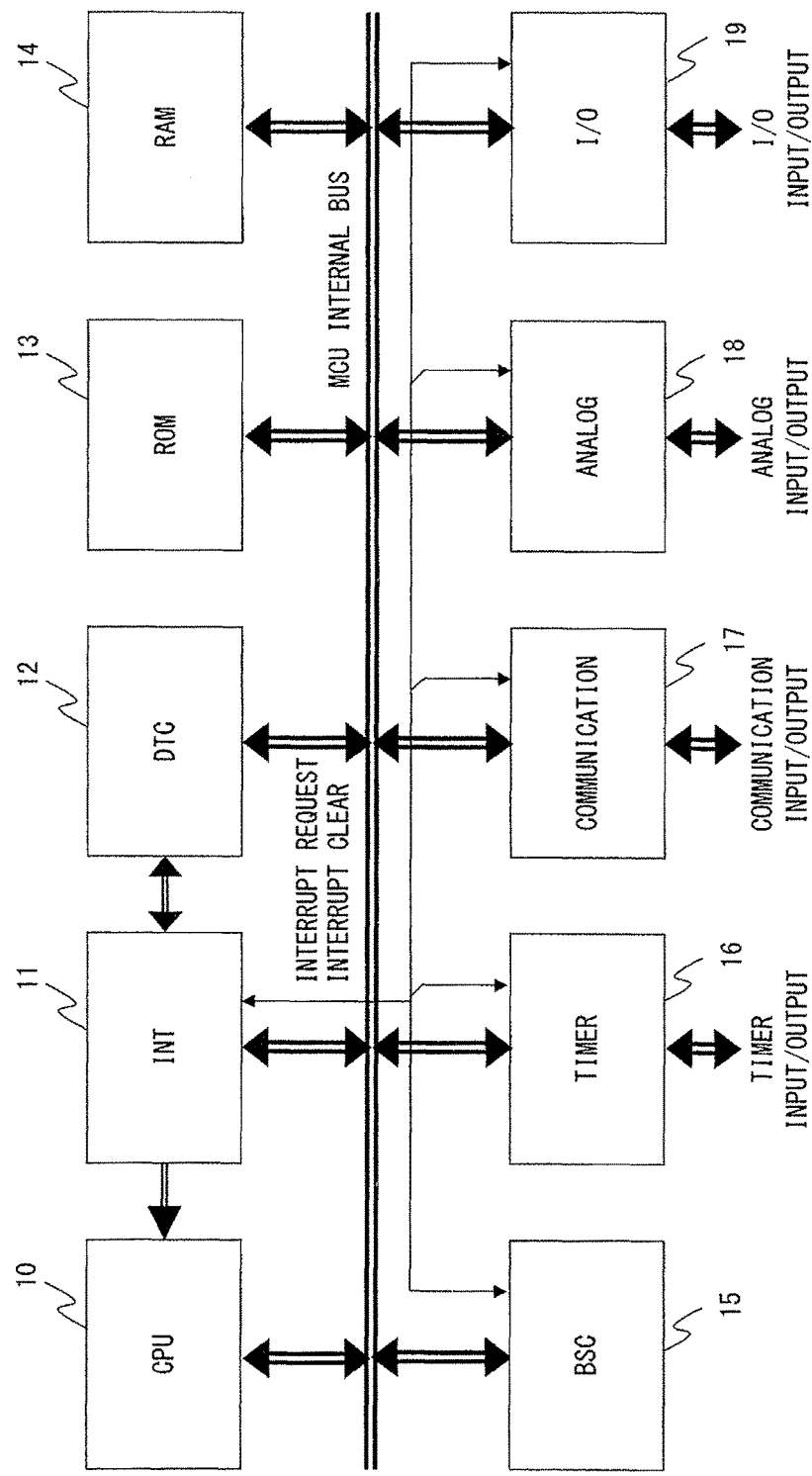
FIG. 1 is a block diagram showing a configuration of a microcomputer 1 according to a first embodiment.

FIG. 1 is a block diagram showing a configuration of a microcomputer according to this embodiment. The microcomputer 1 includes a central processing unit (CPU) 10, an interrupt controller (INT) 11, a data transfer controller (DTC) 12, a ROM (Read Only Memory) 13, a RAM (Random Access Memory) 14, a bus controller (BSC) 15, a timer 16, a communication module 17, an analog module 18, and an input/output port (I/O) 19.

The central processing unit (CPU) 10 is a processing unit that performs the whole control of the microcomputer 1, and reads out an instruction from the ROM 13 to execute the instruction.

The interrupt controller (INT) 11 receives an interrupt request from the timer 16, the communication module 17, the analog module 18 or the like and an interrupt request input to the I/O input/output port 19 based on a plurality of external interrupt signals from outside of the microcomputer 1. The interrupt controller (INT) 11 outputs an interrupt or a data transfer request to the central processing unit (CPU) 10 or the data transfer controller (DTC) 12 according to the received interrupt request. The interrupt controller (INT) 11 outputs, when an interrupt is started or ended, an interrupt clear signal which is a signal that clears the interrupt. The interrupt clear signal is output to an output destination according to the interrupt signal or an interrupt factor flag (corresponding one of the timer 16, the communication module 17, the analog module 18, and the input/output port 19). The detailed configuration of the interrupt controller (INT) 11 will be described later with reference to FIG. 2.

The data transfer controller (DTC) 12 carries out a data transfer according to setting processing of the central processing unit (CPU) 10. The data transfer controller (DTC) 12 executes analysis processing (mode determination and the like described later) which is normally performed by the central processing unit (CPU) 10 to carry out data transfer processing. The detailed configuration of the data transfer controller (DTC) 12 will be described later with reference to FIG. 3.

The bus controller (BSC) 15 receives a bus request signal from the central processing unit (CPU) 10 or the data transfer controller (DTC) 12 to arbitrate a bus in the microcomputer 1. The bus controller (BSC) 15 outputs a bus use permission signal to a processing unit which gives a use permission. Therefore, the bus controller (BSC) 15 receives or outputs a bus request or a bus acknowledge from or to the central processing unit (CPU) 10 and the data transfer controller (DTC) 12. Further, the bus controller (BSC) 15 receives or outputs a bus command, a wait, an address, data and the like from or to the central processing unit (CPU) 10 or the data transfer controller (DTC) 12 that has given the bus use permission signal (bus acknowledge). The bus controller (BSC) 15 therefore achieves reading/writing from the central processing unit (CPU) 10 or the data transfer controller (DTC) 12 for the RAM 14 connected to an internal bus or other functional blocks and modules.

The timer 16 performs general counting processing performed in the microcomputer 1. The communication module 17 is formed of, for example, a serial communication interface. The analog module 18 is a module that performs analog-digital conversion processing, and is formed of, for example, an A/D converter or a D/A converter.

Figure 2:
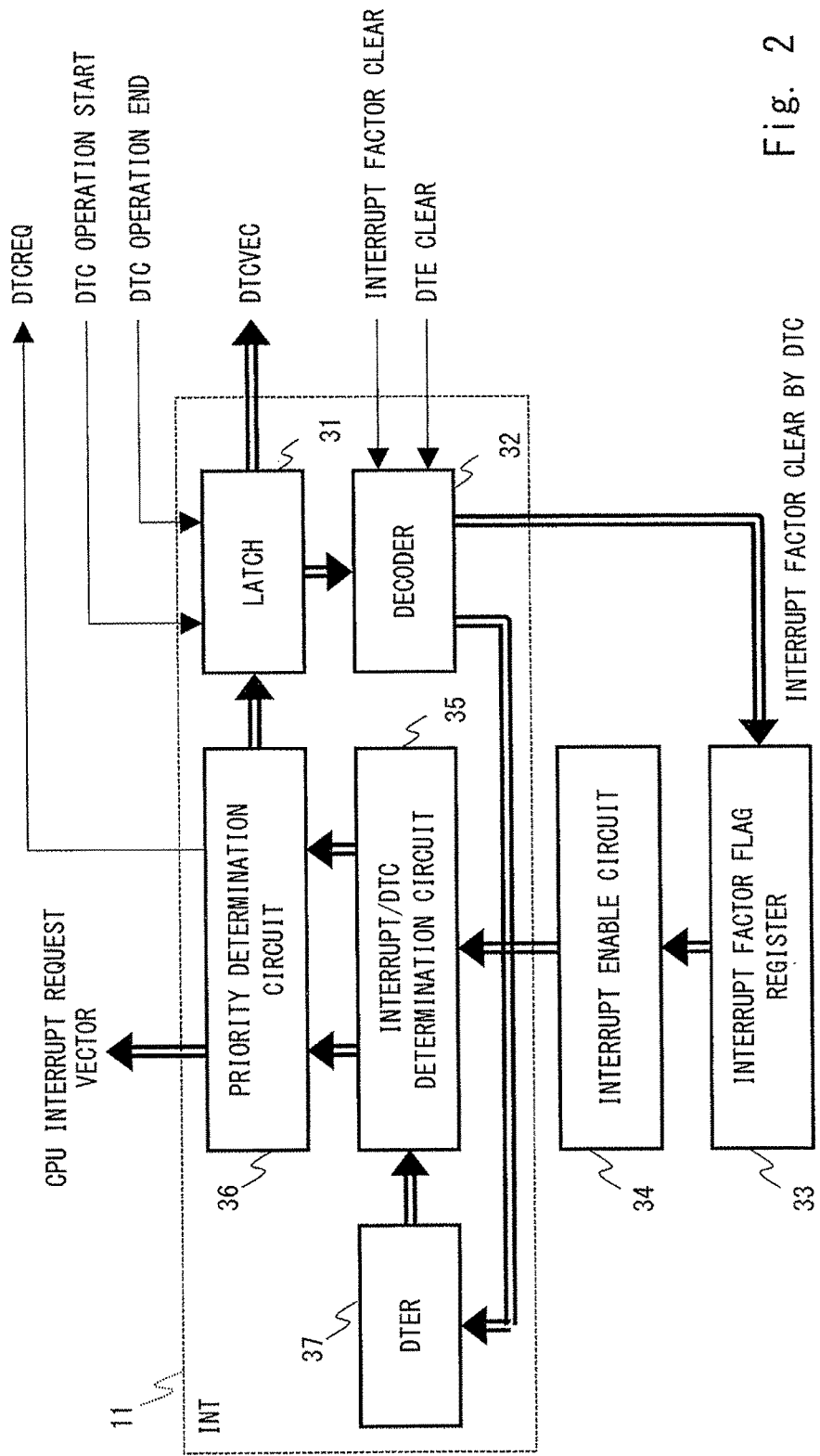
FIG. 2 is a block diagram showing a configuration of an interrupt controller (INT) 11 according to the first embodiment.

Referring next to FIG. 2, the detailed configuration of the interrupt controller (INT) 11 will be described. An interrupt factor of the microcomputer 1 includes two types of an internal interrupt and an external interrupt. An interrupt factor flag register 33 stores an interrupt flag for each interrupt factor (internal interrupt, external interrupt). The interrupt factor flag of the internal interrupt is set to 1 when the timer 16, the communication module 17, end the analog module 18 are in a predetermined state. The interrupt factor flag of the external interrupt is set to 1 when an external interrupt input terminal reaches a predetermined level or a predetermined signal change occurs. Each interrupt factor flag is cleared to 0 by a predetermined writing operation by the central processing unit (CPU) 10. Further, each interrupt factor flag is cleared to 0 when the data transfer of the data transfer controller (DTC) 12 is ended.

An interrupt enable circuit 34 reads out the interrupt factor flag from the interrupt factor flag register 33 to output the interrupt factor flag to an interrupt/DTC determination circuit 35. Further, the interrupt enable circuit 34 receives data from a DTC enable register (DTER) 37 to output the data to the interrupt/DTC determination circuit 35. The DTC enable register (DTER) 37 is a register that is readable or writable from the central processing unit (CPU) 10, and holds a value of 1 bit for each interrupt factor. In the following description, 1 bit for this interrupt factor is also referred to as a DTE bit. Each DTE bit is a bit to set, when the interrupt request is issued, whether to start the data transfer controller (DTC) 12 or to allow an interrupt by the central processing unit (CPU) 10. When the DTE bit for an interrupt factor in the DTC enable register (DTER) 37 is set to 0, an interrupt request for the central processing unit (CPU) 10 is issued. Meanwhile, when the DTE bit for an interrupt factor in the DTC enable register (DTER) 37 is set to 1, a start request for the data transfer controller (DTC) 12 is issued.

When the interrupt factor flag becomes 1, the interrupt/DTC determination circuit 35 determines the DTE bit in the DTC enable register (DTER) 37 to output an interrupt request to the central processing unit (CPU) 10 or a start request to the data transfer controller (DTC) 12 to a priority determination circuit 36. The interrupt request to the central processing unit (CPU) 10 and the start request to the data transfer controller (DTC) 12 are independently input to the priority determination circuit 36.

The priority determination circuit 36 is formed so as to be able to refer to an interrupt mask level and a priority register (not shown). The priority determination circuit 36 refers to the priority register or the interrupt mask level to determine the priority for each request when there are a plurality of interrupt requests (or start requests). The priority determination circuit 36 generates a vector number for a request with the highest priority. The priority determination circuit 36 carries out determination for each of the interrupt request to the central processing unit (CPU) 10 and the start request to the data transfer controller (DTC) 12. The priority determination circuit 36 outputs the CPU interrupt request and the vector number to the central processing unit (CPU) 10.

In a similar way, the priority determination circuit 36 outputs a DTC start request (DTCREQ) and a vector number (DTCVEC) to the data transfer controller (DTC) 12. More specifically, the priority determination circuit 36 directly outputs the DTC start request (DTCREQ) to the data transfer controller (DTC) 12, and outputs the vector rounder (DTCVEC) to a latch circuit 31. The latch circuit 31 receives a DTC operation start signal and a DTC operation end signal from the data transfer controller (DTC) 12. When the DTC operation start signal is in an active state, the vector number (DTCVEC) held by the latch circuit 31 is latched or held. In summary, the vector number (DTCVEC) is notified to the data transfer controller (DTC) 12. When the DTC operation end signal is in the active state, the latch of the vector number (DTCVEC) is ended. When the DTC operation end signal is in the active state, the vector number (DTCVEC) and the DTC operation end signal are input to a decoder 32. In response to the input or the vector number (DTCVEC) and the DTC operation end signal, the decoder 32 executes 0 clear of the corresponding interrupt request flag.

When the data transfer controller (DTC) 12 is started due to the occurrence of a predetermined interrupt factor, the central processing unit (CPU) 10 writes data transfer information (also referred to as a transfer information set) in a predetermined address in a data transfer information arrangement area of a storage device (e.g., RAM 14) in advance. Further, the central processing unit (CPU) 10 sets both of the interrupt enable bit regarding the interrupt factor and the DTE bit corresponding to the interrupt factor to 1.

When the interrupt factor flag is set to 1 after the DTE bit and the interrupt enable bit of the interrupt factor are set to 1, the data transfer controller (DTC) 12 is started. Since the DTE bit is set to 1, an interrupt to the central processing unit (CPU) 10 is not requested.

When the predetermined data transfer is ended, the data transfer controller (DTC) 12 clears the DTE bit corresponding to the data transfer to 0. Since the DTE bit is cleared to 0 in a state in which the interrupt factor flag is set to 1, an interrupt to the central processing unit (CPU) 10 is requested. The central processing unit (CPU) 10 executes processing corresponding to the end of the predetermined data transfer according to this interrupt, end re-configures the data transfer information and the DTE bit.

Figure 3:
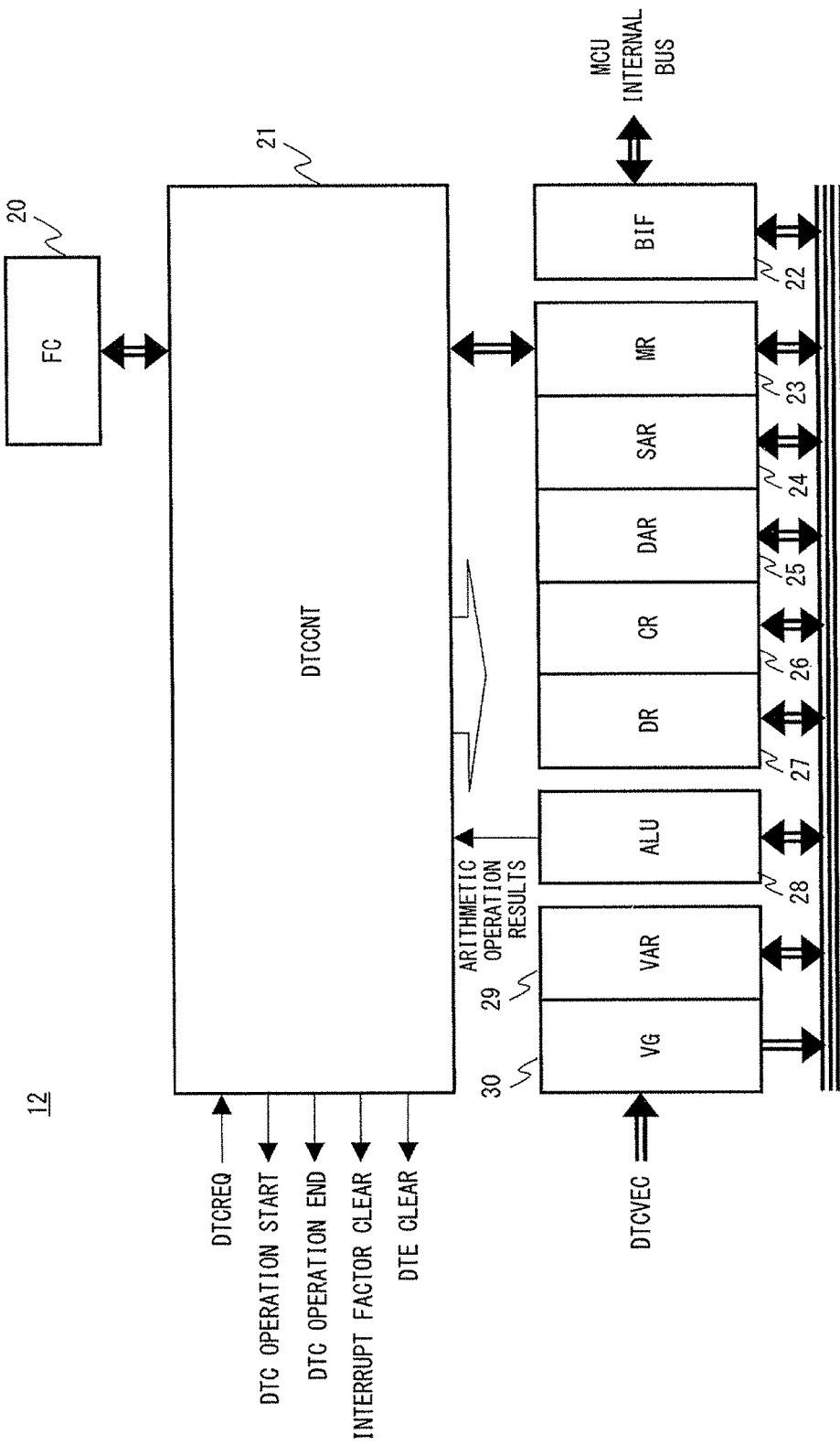
FIG. 3 is a block diagram showing a configuration of a data transfer controller (DTC) 12 according to the first embodiment.

Referring next to FIG. 3, the data transfer controller (DTC) 12 will be described. The data transfer controller (DTC) 12 includes a data transfer function controller (FC) 20, a data transfer control block (DTCCNT) 21, a bus interface (BIF) 22, a destination register (MR) 23, a source address register (SAR) 24, a destination address register (DAR) 25, a data transfer counter (CR) 26, a data register (DR) 27, an arithmetic operation unit (ALU) 28, a vector address register (VAR) 29, and a vector generation block (VG) 30.

The data transfer control block (DTCCNT) 21 is a controller that switches data transfer processing according to the data read in the mode register (MR) 23. The detailed operations of the data transfer control block (DTCCNT) 21 will be described later with reference to FIGS. 5 to 13.

The data transfer function controller (FC) 20 holds necessary data from previous data transfer information and the transfer data in a predetermined data transfer mode such as a shift mode described later. The data transfer control block (DTCCNT) 21 changes, for example, addresses using the data that is read out later in the data register (MR) 23 and the data held in the data transfer function controller (FC) 20. In short, the data transfer function controller (FC) 20 holds data to change (modify) the subsequent data transfer information.

The bus interface (BIF) 22 operates as an interface of a DTC internal bus and the internal bus of the microcomputer 1. The bus interface (BIF) 22 mediates the input/output of data such as a bus request, a bus acknowledge, a bus command, a wait, and an address.

The vector generation block (VG) 30 generates a vector address according to the vector number (DTCVEC) input from the interrupt controller (INT) 11. The vector generation block (VG) 30 multiplies, for example, the vector rubber (DTCVEC) by 4 and then adds the resulting value and a predetermined offset, thereby generating the vector address.

The vector address register (VAR) 29 stores a head address of the data transfer information read out from the storage area (RAM 14 or the like) using the vector address. The mode register (MR) 23, the source address register (SAR) 24, the destination address register (DAR) 25, the data transfer counter (CR) 26, and the data register (DR) 27 each store the data transfer information sequentially read out from the RAM 14 or the like based on the head address of the data transfer information stored in the vector address register (VAR) 29. The data transfer information is various types of information used for data transfer processing. Specifically, the data transfer information is divided to be held in the mode register (MR) 23, the source address register (SAR) 24, the destination address register (DAR) 25, the data, transfer counter (CR) 26, and the data register (DR) 27. The mode register (MR) 23 holds the transfer mode information indicating the contents of control of the data transfer. The source address register (SAR) 24 holds a transfer source address. The destination address register (DAR) 25 holds a transfer destination address. The data transfer counter (CR) 26 holds a number of data transfer operations. The data register (DR) 27 holds data including comparison targets and accumulation results.

The arithmetic operation unit (ALU) 28 has a function such as a shift operation, a logical operation, an arithmetic operation, a CRC operation. The arithmetic operation unit (ALU) 28 is able to perform an arithmetic operation. As an example, the arithmetic operation unit (ALU) 28 shifts one piece of input data (e.g., TCRL) to subtract the resulting value from another piece of input data (data stored in the source address register (SAR) 24 or the like). The arithmetic operation unit (ALU) 28 notifies the data transfer control block (DTCCNT) 21 of the operation results (zero detection, carry/borrow detection) and the like of the comparison of two pieces of data, e.g., comparison between the data that is read out and data stored in the data register (DR) 27 (coincident, magnitude comparison).

The DTC internal bus includes a plurality of buses (buses A, B, and C). The arithmetic operation unit (ALU) 28 is able to read out data from each of the registers 23 to 27 through a plurality of buses. By limiting the information held in the source address register (SAR) 24, the destination address register (DAR) 25, the data transfer counter (CR) 26, and the data register (DR) 27, the number of circuit paths in the data transfer controller (DTC) 12 decreases. It is also possible to suppress the logic size of the data transfer control block (DTCCNT) 21 that controls these registers.

Referring next to FIG. 4, data transfer information (transfer information set) managed by the data transfer controller (DTC) 12 will be described. As described above, the data transfer information is divided to be held in the mode register (MR) 23, the source address register (SAR) 24, the destination address register (DAR) 25, the data transfer counter (CR) 26, and the data register (DR) 27.

The data transfer counter (CR) 26 is divided into, as shown in FIG. 4, a block transfer count register (BTCR) and a transfer count register (TCR). The transfer count register (TCR) is divided into upper 8 bits (TCRH) and lower 8 bits (TCRL).

As each register (23 to 27) that holds the data transfer information, only one set of data holding circuit is provided in the data transfer controller (DTC) 12 and, while not particularly limited, the data holding circuit does not exist on the address space of the central processing unit (CPU) 10. A required number of sets of the data transfer information which should be stored in each register (23 to 27) are arranged in a predetermined data transfer information arrangement area (e.g., RAM 14 and will be described later with reference to FIG. 6 and the like) on the CPU address space.

Next, a bit configuration of the mode register (MR) 23 will be described. Bits 31, 30, 29, and 28 are an ACM bit, an SWM bit, a TSM bit, and an SFM bit, respectively, and data of these bits specify a data transfer mode.

When the configuration data of the bits 31 to 28 is 0000, the mode indicates a normal data transfer mode. In this case, the mode register (MR) 23, the source address register (SAR) 24, the destination address register (DAR) 25, and the data transfer counter (CR) 26 are selected as the data transfer information. In short, the data transfer information read out by the data transfer control block (DTCCNT) 21 has a data size of 32 bits×4.

When the ACM bit (also referred to as accumulation mode information) is set to 1, the mode indicates an accumulation mode. In this case, the mode register (MR) 23, the source address register (SAR) 24, the destination address register (DAR) 25, the data transfer counter (CR) 26, and the data register (DR) 27 are selected as the data transfer information. In short, the data transfer information read out by the data transfer control block (DTCCNT) 21 has a data size of 32 bits×5.

When the SWM bit (also referred to as switch mode information) is set to 1, the mode indicates a switch mode. In this case, the mode register (MR) 23, the source address register (SAR) 24, and the data register (DR) 27 are selected as the data transfer information. Therefore, the data transfer information read out by the data transfer control block (DTCCNT) 21 has a data size of 32 bits×3. In the switch mode, the data transfer control block (DTCCNT) 21 switches the data transfer information used for the next data transfer according to the data that is read out. The detailed operation will be described later with reference to FIGS. 9 and 10.

When the TSM bit (also referred to as test transfer mode information) is set to 1, the mode indicates a test transfer mode. In this case, the mode register (MR) 13, the source address register (SAR) 24, the destination address register (DAR) 25, the data transfer counter (CR) 26, and the data register (DR) 27 are selected as the data transfer information. Therefore, the data transfer information read out by the data transfer control block (DTCCNT) 21 has a data size of 32 bits×3.

When the SFM bit (referred to as shift mode information) is set to 1, the mode indicates a shift mode. In this case, the mode register (MR) 23 and the source address register (SAR) 24 are selected as the data transfer information. Therefore, the data transfer information read out by the data transfer control block (DTCCNT) 21 has a data size of 32 bits×2. In the shift mode, the data transfer controller (DTC) 12 saves the data that is read out in the data transfer function controller (FC) 20, and adjusts the transfer source address and the like using the saved data in the next data transfer. The detailed operations will be described later with reference to FIGS. 12 and 13.

As described above, according to the configurations of the ACM bit, the SWM bit, the TSM bit, and the SFM bit, the data capacity that the data transfer control block (DTCCNT) 21 reads out in each register changes.

Bit 27 and bit 26 of the mode register (MR) 23 are an ALM bit and a CLM bit, respectively. These bits specify the method of setting the data transfer information of the data transfer controller (DTC) 12.

When the ALM bit (also referred to as ALM information) is set to 1, the mode indicates an address load mode. In the address load mode, the transfer data read out according to the source address register (SAR) 24 is written in the destination address register (DAR) 25. In the writing operation, lower bits are set according to the data size. In summary, in the address load mode, the transfer destination address is dynamically changed according to the data that is read out. While not particularly limited, data is not written into the transfer destination address. After the destination address register (DAR) 25 is set, the ALM bit is cleared to 0. When the destination address register (DAR) 25 is set, the data transfer counter (CR) 26 is not updated.

When the CLM bit (also referred to as CLM information) is set to 1, the mode indicates a counter load mode. In the counter load mode, the transfer data read out according to the source address register (SAR) 24 is written into the data transfer counter (CR) 26. In summary, in the counter load mode, the number of transfer operations is dynamically changed according to the data that is read out. In the writing operation, upper bits are zero-extended as needed. When the mode is the counter load mode and the block transfer mode is specified by the TMD1 bit and the TMD0 bit described later, BTCR (upper 16 bits) of the data transfer counter (CR) 26 is set. While not particularly limited, in the counter load mode, data may be written in the transfer destination address as well. After the data transfer counter (CR) 26 is set, the CLM bit is cleared to 0. When the data transfer counter (CR) 26 is set, the data transfer counter (CR) 26 is not updated.

When both of the ALM bit and the CLM bit are set to 1, the destination address register (DAR) 25 is set in the first data transfer and the data transfer counter (CR) 26 is set in the second data transfer. The detailed operation examples of the address load mode and the counter load mode will be described later with reference to FIGS. 7 and 8.

Bit 23 of the mode register (MR) 23 is a SEL bit. The SEL bit specifies, in the shift mode, whether to perform an arithmetic operation on any one of the transfer source address and the transfer destination address.

Bits 19 to 16 of the mode register (MR) 23 are bits indicating OP3 to OP0. These bits specify the type of the arithmetic operation in each mode.

Bit 15 and bit 14 of the mode register (MR) 23 are an SM1 bit and an SM0 bit, respectively. These bits specify whether to increment, decrement, or fix the source address register (SAR) 24 after the data reading.

Bit 13 and bit 12 of the mode register (MR) 23 are a DM1 bit and a DM0 bit. These bits specify whether to increment, decrement, or fix the destination address register (DAR) 25 after the data writing.

Bit 11 and bit 10 of the mode register (MR) 23 are a TMD1 bit and a TMD0 bit, respectively. These bits are used to select the data transfer mode. The data transfer mode includes a normal mode, a repeat mode, and a block transfer mode.

When both of the TMD1 bit and the TMD0 bit are 0, the mode indicates the normal mode. In the normal mode, for each start (each occurrence of the start factor), data transfer is performed once from the address indicated by the source address register (SAR) 24 to the address indicated by the destination address register (DAR) 25.

After the data transfer, the operation of the source address register (SAR) 24 and the destination address register (DAR) 25 (increment, decrement, or fix) is performed based on the configurations of the SM1 bit, the SM0 bit, the DM1 bit, and the DM0 bit. The data transfer counter (CR) 26 is then decremented.

These operations are executed once for each occurrence of the start factor, and this execution is carried out for the number of times specified by the data transfer counter (CR) 26. When the execution is ended for the number of times specified by the data transfer counter (CR) 26, a series of data transfer operations by the data transfer controller (DTC) 12 are ended.

When the TMD1 bit and the TMD0 bit are set to 0 and 1, respectively, the data transfer mode is the repeat mode. When the TMD1 bit and the TMD0 bit are set to 1 and 0, respectively, the data transfer mode is the block transfer mode. The repeat mode and the block transfer mode are achieved by a known technique.

Bit 9 of the mode register (MR) 23 is a DIR bit. The DIR bit is a bit to specify which one of the transfer source and the transfer destination should be made a repeat area (or block area).

Bit 7 and Bit 6 of the mode register (MR) 23 are an Sz1 bit and an Sz0 bit, respectively. These bits are bits to specify whether one data transfer operation is to be executed in a byte size, a word size, or a long word size.

Bit 2 to bit 0 of the mode register (MR) 23 are an NXTS bit, an NXTE1 bit, and an NXTE0 bit, respectively. These bits are bits to select whether to end the data transfer or to perform the next data transfer for one start factor. In other words, these bits are bits to specify whether to perform a chain operation. The chain operation is an operation of reading out the data transfer information, executing the data transfer, writing the data transfer information, and further reading out the data transfer information from successive data transfer information addresses, executing the data transfer, and writing the data transfer information.

The NXTS bit (chain determination information) executes determination processing using the transfer data and the data register (DR) 27 to select whether to perform the chain operation. The contents of the check are selected according to the above OP3 to OP0. The NXTE1 bit is a bit to select whether to always perform the chain operation. When the NXTE1 bit is set to 0, the operation of the data transfer controller (DTC) 12 is ended after reading of the data transfer information, data transfer, and writing of the data transfer information are ended. When the NXTE1 bit is set to 0, reading of the data transfer information from the successive data transfer information addresses, data transfer, and writing of the data transfer information are performed after reading of the data transfer information, data transfer, and writing of the data transfer information are ended. The NXTE0 bit is a bit to set whether to perform the chain operation when the data transfer counter (CR) 26 becomes 0.

Figure 5:
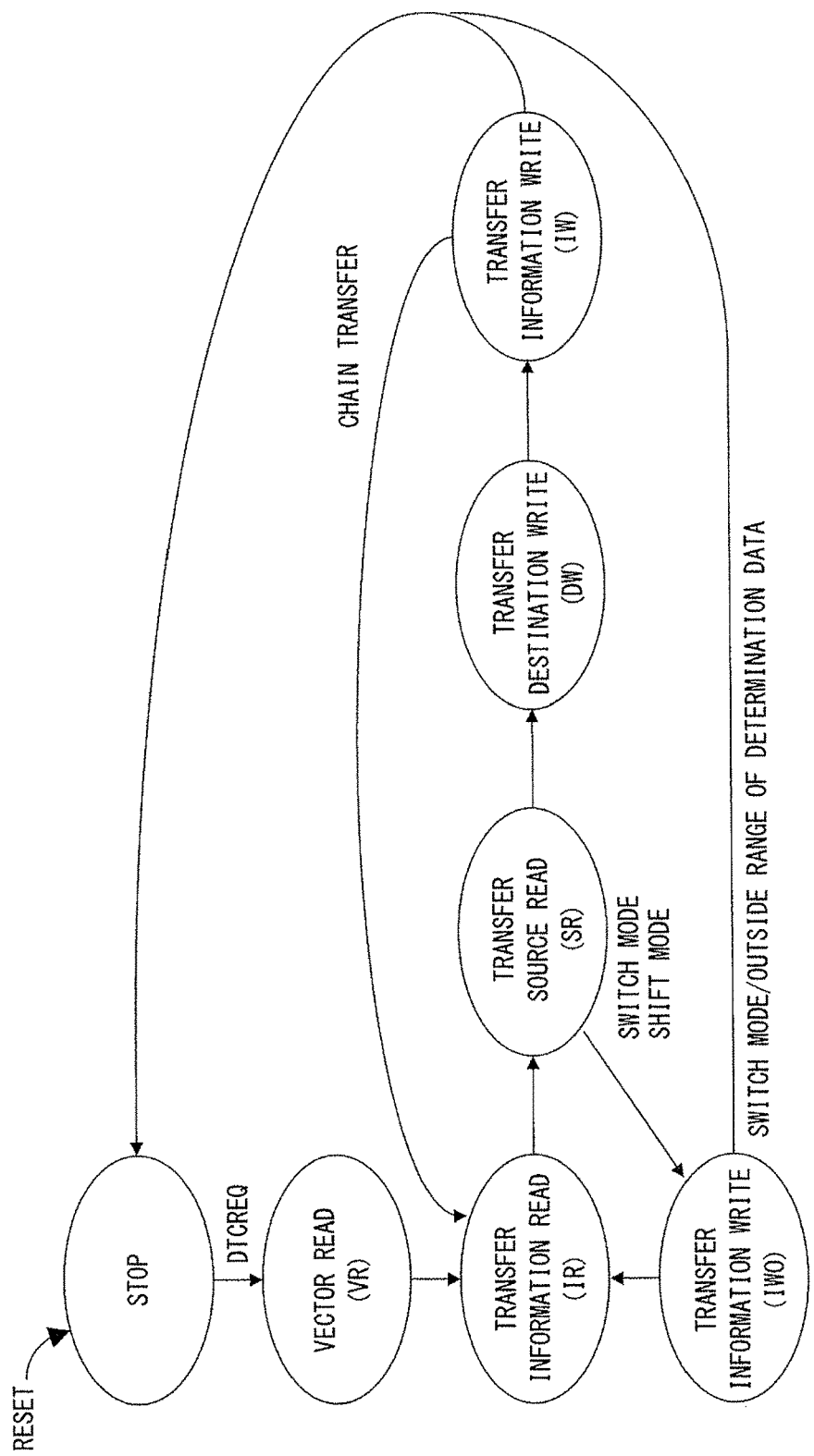
FIG. 5 is a state transition diagram of the data transfer controller (DTC) 12 according to the first embodiment.

Referring next to FIG. 5, a state transition of the data transfer controller (DTC) 12 will be described. The interrupt controller (INT) 11 outputs the DTC start request (DTCREQ) and the vector number (DTCVEC) to the data transfer controller (DTC) 12 by the above-mentioned method. The vector generation block (VG) 30 generates the vector address according to the vector number (DTCVEC). The vector address register (VAR) 29 stores the head address of the data transfer information that is read out by the reading using the vector address.

After that, the data transfer controller (DTC) 12 makes a transition to the IR state. The data transfer control block (DTCCNT) 21 writes the data of the top 32 bits of the data transfer information in the mode register (MR) 23 from the data transfer information arrangement area using the head address held by the vector address register (VAR) 29. The data transfer control block (DTCCNT) 21 analyzes the transfer mode (normal transfer mode, accumulation mode, switch mode, test transfer mode, shift mode) from the data in the mode register (MR) 23. The data transfer control block (DTCCNT) 21 reads out only necessary data of the data transfer information from the data transfer information arrangement area according to the transfer mode to write the data into each of the registers 24 to 27.

When the transfer mode is the normal transfer mode or the accumulation mode, the data transfer control block (DTCCNT) 21 makes a transition from the IR state, the SR state, the DW state, and the IW state in this order. In the following description, the IR state, the SR state, the DW state, and the IW state will be described.

In the SR state, the data transfer control block (DTCCNT) 21 reads out the transfer data from the address indicated by the source address register (SAR) 24. The data transfer control block (DTCCNT) 21 changes, for example, the source address register (SAR) 24 according to the configuration of the mode register (MR) 23 (e.g., SM1 bit, SM0 bit) after the reading operation. After that, the data transfer controller (DTC) 12 makes a transition from the SR state to the DW state.

In the DW state, the data transfer control block (DTCCNT) 21 writes the transfer data read out in the SR state to the address indicated by the destination address register (MR) 25. The data transfer control block (DTCCNT) 21 changes, for example, the destination address register (DAR) 25 according to the configuration of the mode register (MR) 23 (e.g., DM1 bit, DM0 bit) after the writing operation. Further, the data transfer counter (CR) 26 is decremented.

In the DW state, when the data transfer mode is the accumulation mode, the arithmetic operation unit (ALU) 28 executes an operation using the transfer data and the data in the data register (DR) 23 to store the operation results in the data register (DR) 27. In the block transfer mode, the SW state and the DW state are repeatedly performed, and the illustration and detailed explanation will be omitted. After the processing stated above, the data transfer controller (DTC) 12 makes a transition from the DW state to the IW state.

In the IW state, the date transfer control block (DTCCNT) 21 writes back the data in the register among the registers 23 to 27 where a change has occurred in the SR state and the DW state into the data transfer information arrangement area. In other words, in the IW state, the data transfer control block (DTCCNT) 21 does not rewrite back data in the register among the registers 23 to 27 where no change has occurred in the IR state and the DM state. For example, the data transfer control block (DTCCNT) 21 does not write back the data in the register when the destination address register (DAR) 25 is fixed (no change).

When the mode register (MR) 23 specifies the chain operation in the IW state, the data transfer control block (DTCCNT) 21 continuously executes the IR state, the SR state, the DW state, and the IW state. An operational example of the chain operation will be described with reference to FIG. 8 and the like.

Next, the state transition after the IR state when the transfer mode is the switch mode will be described. The data transfer control block (DTCCNT) 21 makes a transition from the IR state to the above-mentioned SR state, and from the SR state to the IW0 state.

In the IW0 state, the arithmetic operation unit (ALU) 28 compares the data (determination data) read out using the source address register (SAR) 24 with the data in the data register (DR) 28 to determine whether the determination data is within a range. When the determination data is within the range, the data transfer control block (DTCCNT) 21 calculates the head address of the data transfer information which will be read out next, and then makes a transition to the IR state. After that, similarly to the normal transfer mode, the state makes a transition to the SR state, the DW state, the IW state.

Meanwhile, when the determination data is outside the range, the data transfer control block (DTCCNT) 21 clears the DTE bit corresponding to the start factor to make a transition to a stop state. Since the DTE bit is cleared, an interrupt is requested for the central processing unit (CPU) 10, and the central processing unit (CPU) 10 carries out recovery processing and the like.

Next, the state transition after the IR state when the transfer mode is the shift mode will be described. The data transfer control block (DTCCNT) 21 saves data that is recurred in the arithmetic operation performed later in the IW0 state in the data transfer function controller (FC) 20, and then makes a transition to the IR state. The data transfer control block (DTCCNT) 21 uses the saved data to calculate the transfer source address or the transfer destination address when next data is transferred. The detailed operational example will be described with reference to FIG. 12.

Figure 6:
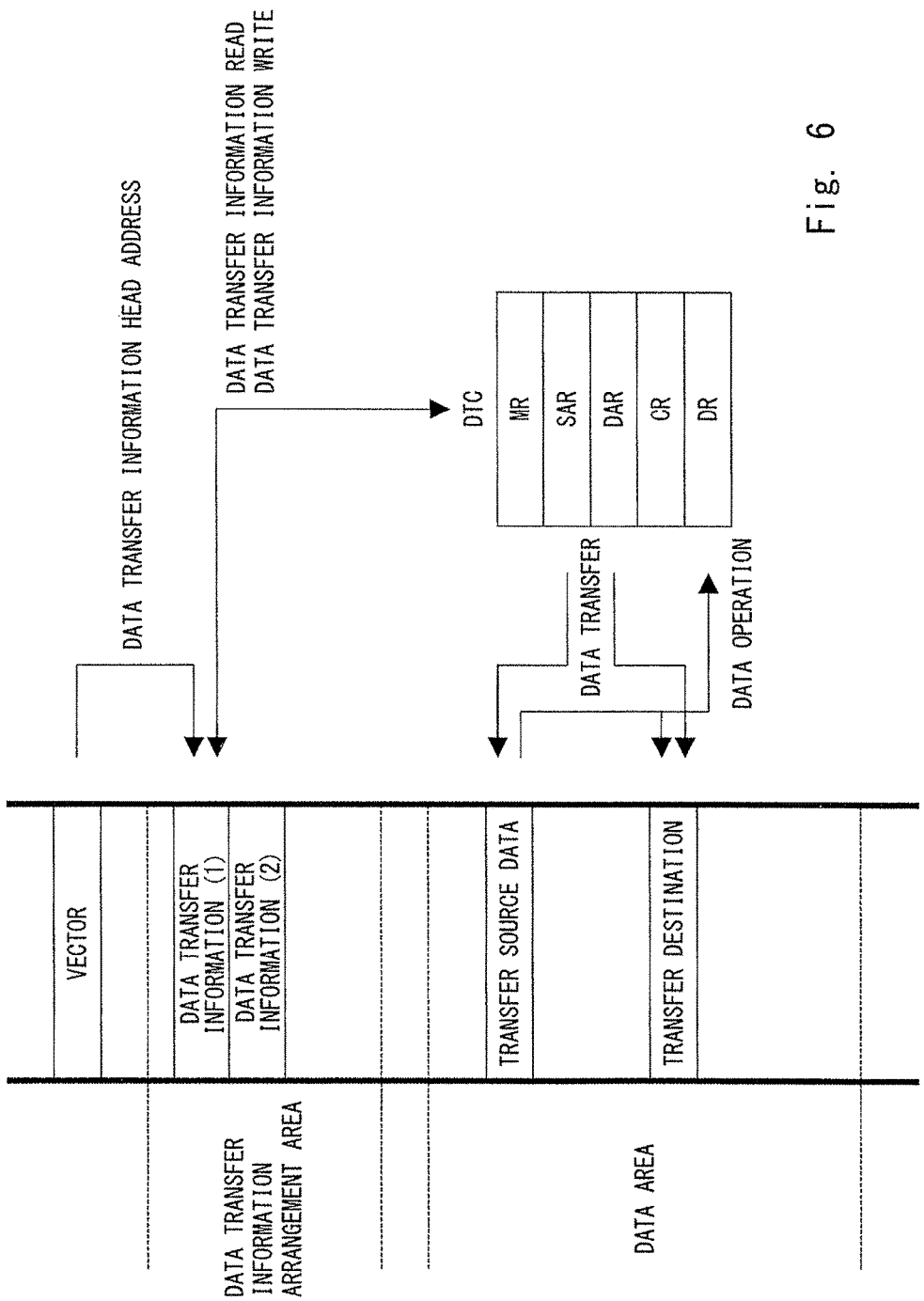
FIG. 6 is a diagram showing an operation of an accumulation mode of the microcomputer 1 according to the first embodiment.

With reference next to FIG. 6, an operational example in the accumulation mode will be described. FIG. 6 is an operation explanatory diagram showing a relation between the data transfer controller (DTC) 12 and the data transfer information arrangement area and the data area (e.g., RAM 14) when the operation is performed in the accumulation mode. The central processing unit (CPU) 10 writes desired data transfer information (data transfer information (1) and (2) in FIG. 6) in a predetermined address in the data transfer information arrangement area. Further, the central processing unit (CPU) 10 sets the DTE bit of the interrupt factor corresponding to the accumulation mode to 1. Since an interrupt occurs in this state, the data transfer controller (DTC) 12 is started.

When the data transfer controller (DTC) 12 is started, the vector number (DTCVEC) is input to the data transfer controller (DTC) 12 as described above. As described above, the head address of the data transfer information read out according to the vector number (DTCVEC) is stored in the vector address register (VAR) 29. In this example, it is assumed that the ACM bit of the data transfer information (1) is set to 1 (i.e., accumulation mode), and each of the NXTS bit and the NXTE0 bit is set to 1.

The data transfer control block (DTCCNT) 21 reads out the data transfer information (1) from the data transfer information arrangement area using this head address. More specifically, the data transfer control block (DTCCNT) 21 writes the data read out from the data transfer information (1) of the data transfer information arrangement area in the mode register (MR) 23, and determines from this data that the mode is the accumulation mode. Since the mode is the accumulation mode, the data transfer control block (DTCCNT) 21 writes the data read out from the data transfer information (1) into the source address register (SAR) 24, the destination address register (DAR) 25, the data transfer counter (CR) 26, and the data register (DR) 27.

The data transfer control block (DTCCNT) 21 reads out the transfer data from the transfer source address specified by the source address register (SAR) 24. The data transfer control block (DTCCNT) 21 writes the transfer data that is read out into the transfer destination address indicated by the destination address register (DAR) 25 (see FIG. 6).

At this time, the arithmetic operation unit (ALU) 23 performs an arithmetic operation of the transfer data and the data stored in the data register (DR) 27 to overwrite the operation results in the data register (DR) 27. The contents of the arithmetic operation are specified by the OP3 to OP0 (bits 19 to 16 of the mode register (MR) 23). After the data transfer is ended (i.e., IW state), data in each of the registers 23 to 27 including the data register (DR) 27 where the overwriting is performed is written back in the data transfer information arrangement area. At this time, the value of the data transfer counter (CR) 26 is decremented.

This accumulation mode may be used when, for example, a reception end interrupt of the serial communication interface occurs. The accumulation mode may be used when data is transferred from the reception data register to the RAM 14. When the processing for the number of times specified in the data transfer counter (CR) 26 is ended, the predetermined accumulation result may be stored in the data register (DR) 27.

Consider, for example, a case in which an addition is set as the arithmetic operation. In this case, after the data transfer is ended for the number of times specified by the data transfer counter (CR) 26, sum data is stored in the address corresponding to the data register (DR) 27 in the data transfer information arrangement area. Further, when an exclusive OR is specified as the arithmetic operation, parity data is stored in this address.

Consider another case in which a CRC operation is set as the arithmetic operation. In this case, when an arithmetic operation of 16-bit width is performed, data corresponding to a generating polynomial may be set and held in the upper 16 bits of the data register (DR) 27 and the operation results may be stored in the lower 16 bits of the data register (DR) 27. Alternatively, the generating polynomial may be fixed. The generating polynomial may be selected by the OP3 to OP0 bits. Alternatively, a configuration of specifying the generating polynomial used by other input signals (not shown) may be employed.

In this example, the NXTS bit and the NXTE0 bit are set to 1. Accordingly, when a predetermined number of data transfer operations are ended and the data transfer counter (CR) 26 becomes 0, the arithmetic operation unit (ALU) 28 performs a test using the transfer data and the data in the data register (DR) 27 to determine whether to perform the chain operation according to the test results.

When an addition or an exclusive OR is specified as the arithmetic operation, the arithmetic operation unit (ALU) 28 determines whether the last transfer data is coincident with the data in the data register (DR) 27. When the last transfer data is coincident with the data in the data register (DR) 27, the data transfer controller (DTC) 12 determines that there is no problem and does not perform the chain operation. Meanwhile, when the last transfer data is not coincident with the data in the data register (DR) 27, the data transfer controller (DTC) 12 determines that there is a problem, and performs the chain operation. In the chain operation, a data transfer using the data transfer information (2) stored in the adjacent address of the data transfer information (1) is executed. It is supposed that the data transfer includes a configuration of an error status and processing for a recovery.

When the CRC operation is specified as the arithmetic operation, the arithmetic operation unit (ALU) 28 determines whether the operation result of the last transfer data is 0. When the operation result is 0, the data transfer controller (DTC) 12 ends the processing without performing the chain operation. When the operation result is other than 0, the data transfer controller (DTC) 12 executes the chain operation to execute processing regarding the next data transfer information (2).

The data transfer information arrangement area holds intermediate results of the CRC operation and the check sum in the area corresponding to the data register (DR) 27. Accordingly, even when a plurality of data transfer operations due to different start factors are performed, each arithmetic operation (check sum, CRC operation) can be independently performed. For example, it is possible to transfer reception data from a serial communication interface of a plurality of channels in parallel, and the CRC operation and the calculation of the check sum corresponding to each channel may be performed independently.

Figure 7:
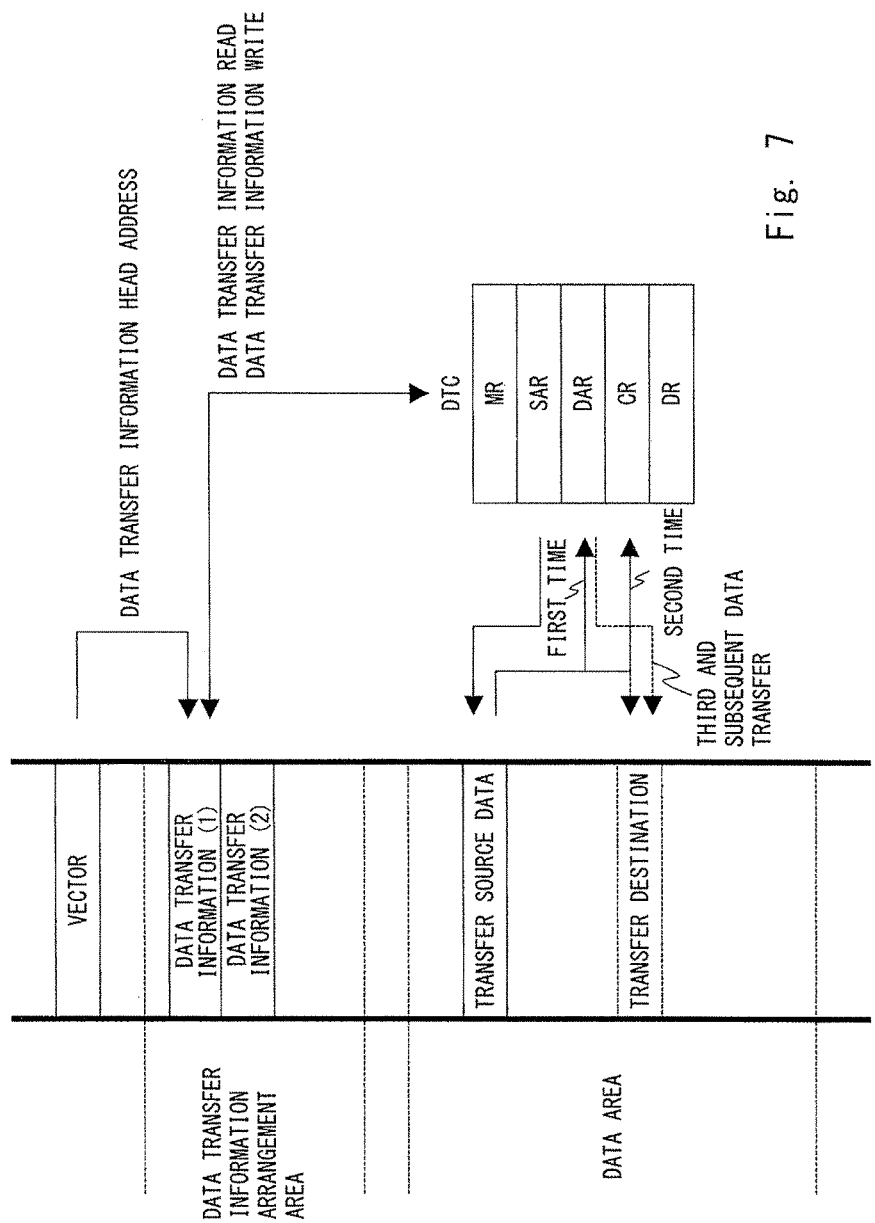
FIG. 7 is a diagram showing operations in an accumulation mode, an address load mode, and a counter load mode of the microcomputer 1 according to the first embodiment.

Referring next to FIG. 7, an operational example when the address load mode and the counter load mode are set in addition to the accumulation mode will be described. FIG. 7 is an operation explanatory diagram snowing a relation between the data transfer controller (DTC) 12 and the data transfer information arrangement area (e.g., RAM 14) in the operations in the accumulation mode, the address load mode, and the counter load mode.

In this example, each of the ACM bit, the ALM bit, and the CLM bit of the data transfer information (1) is set to 1. When the Sz1 bit and the Sz0 bit in the data transfer information (1) specify the byte size or the word size, the upper bits of the transfer destination address (data read out in the destination address register (DAR) 25) are set in advance. When the TMD1 bit and the TMD0 bit specify the block transfer mode, the lower 16 bits of the transfer count number (data read out in the data transfer counter (CR) 26) are set in advance. When the TMD1 bit and the TMD0 bit specify the normal mode, the configuration of the above lower 16 bits can be arbitrarily set.

When the data transfer controller (DTC) 12 is started for the first time (first start), the data transfer control block (DTCCNT) 21 determines that the mode is the accumulation mode from the data written in the mode register (MR) 23. The data is then read out from the data transfer controller (DTC) 12 and the data transfer information (1) and is written in the source address register (SAR) 24, the destination address register (DAR) 25, the data transfer counter (CR) 26, and the data register (DR) 27. The data transfer control block (DTCCNT) 21 reads out the data from the address specified by the source address register (SAR) 24 to write the data that is read out into the destination address register (DAR) 25. In summary, the data transfer control block (DTCCNT) 21 changes the write destination address.

At this time, the data transfer controller (DTC) 12 does not write the data that is read out into the data transfer information arrangement area, and does not execute the arithmetic operation corresponding to the accumulation mode. The data transfer control block (DTCCNT) 21 clears the ALM bit to 0 after data is written into the destination address register (DAR) 25. After that, the data transfer control block (DTCCNT) 21 writes the data in each of the registers 23 to 27 into the data transfer information arrangement area.

When the data transfer controller (DTC) 12 is started for the second time, the data transfer controller (DTC) 12 reads out data from the address specified in the source address register (SAR) 24 and writes the data that is read out into the data transfer counter (CR) 26. In summary, the data transfer control block (DTCCNT) 21 changes the number of data transfer operations.

At this time, the data transfer controller (DTC) 12 does not write the data that is read out into the data transfer information arrangement area, and does not execute the arithmetic operation corresponding to the accumulation mode. The data transfer control block (DTCCNT) 21 clears the CLM bit to 0 after the data is written in the data transfer counter (CR) 26. After that, the data transfer control block (DTCCNT) 21 writes data in each of the registers 23 to 27 into the data transfer information arrangement area.

When the date transfer controller (DTC) 12 is started for the third time, the similar operation as that shown in FIG. 6 is performed. As described above, the data transfer controller (DTC) 12 specifies the transfer destination address of the data by the first start, and specifies the number of transfer operations by the second start. Such an operation may be used, for example, when the specification address, the number of pieces of data, and the data are received in this order through the serial communication interface. The first start occurs when a reception end interrupt occurs. Accordingly, the data transfer controller (DTC) 12 dynamically knows the transfer destination address and the number of pieces of data, thereby performing the data transfer. In the transmission using the serial communication interface, a data transfer count number (value written in the data transfer counter (CR) 26) that the central processing unit (CPU) 10 has set as the data transfer apparatus can be first transferred to the transmission data register. Further, the data transfer controller (DTC) 12 may write the data read out from the address specified in the source address register (SAR) 24 into the transmission data register and write the value of the data register (DR) 27 into the transmission data register at the last stage. The bits that specify the transfer of the data transfer counter (CR) 26 or the data register (DR) 27 may present in the data read out in the mode register (MR) 23 (FIG. 4).

Figure 8:
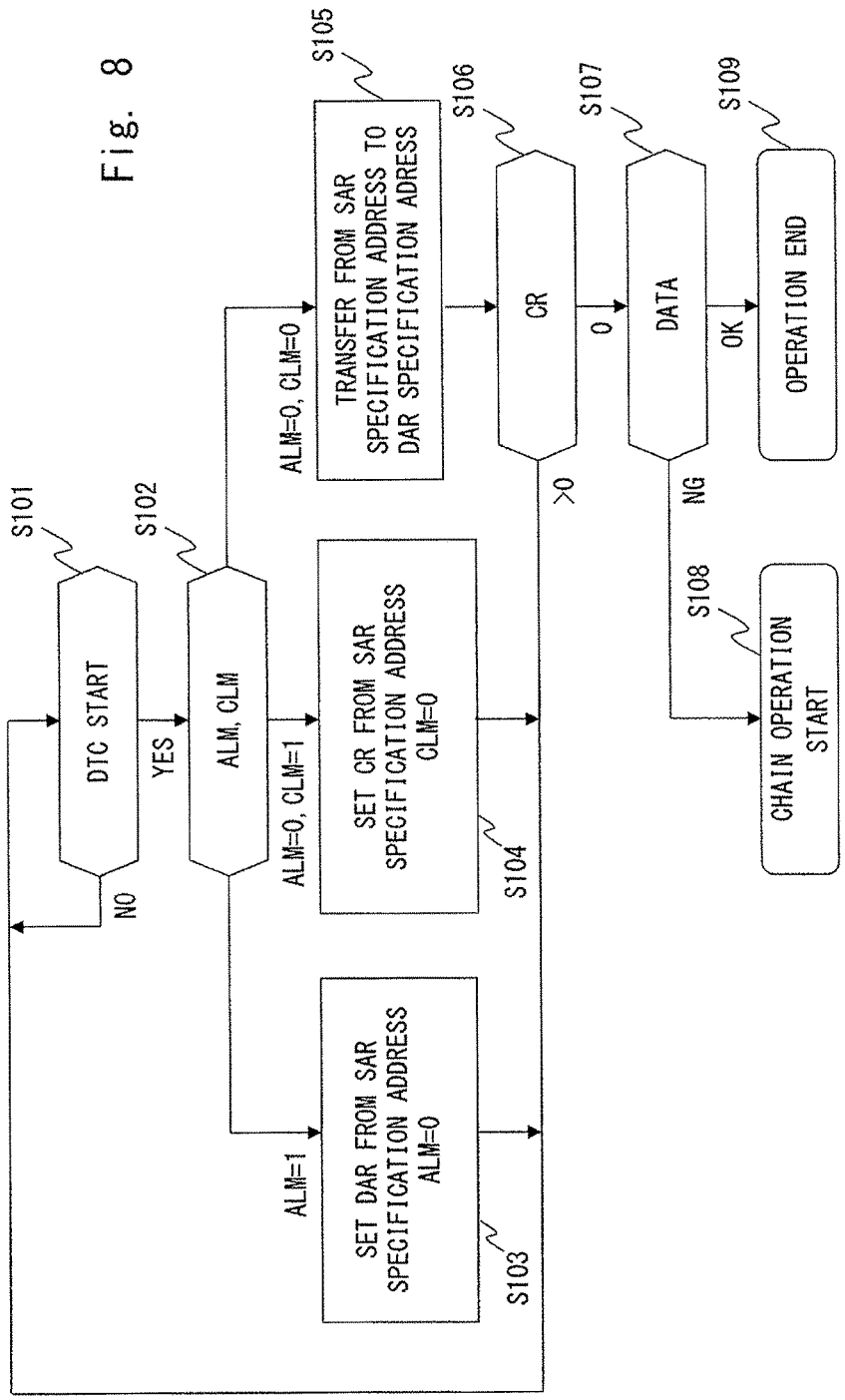
FIG. 8 is a flowchart showing an operation of the microcomputer 1 according to the first embodiment.

Referring next to FIG. 8, an operation of the data transfer controller (DTC) 12 according to each configuration of the accumulation mode, the address load mode, and the counter load mode will be described. FIG. 8 is a flowchart showing an operation of the data transfer controller (DTC) 12 according to the configuration of each mode. In the following description, it is assumed that the NXTS bit and the NXTE0 bit are set to 1.

The data transfer control block (DTCCNT) 21 determines the ALM bit and the CLM bit (S102) after start (S101: Yes). When the ALM bit is set to 1 (S102: ALM=1), the data transfer control block (DTCCNT) 21 reads out data from the address that is specified in the source address register (SAR) 24, writes the data that is read out in the destination address register (DAR) 25, and clear the ALM bit to 0 (S103).

When the CLM bit is set to 1 (S102: CLM=1), the data transfer control block (DTCCNT) 21 reads out data from the address specified in the source address register (SAR) 24, writes the data that is read out in the data transfer counter (CR) 36, and clears the CLM bit to 0 (S104).

When the ALM bit and the CLM bit are cleared to 0 (S102: ALM=0, CLM=0), the data transfer control block (DTCCNT) 21 reads out data from the address specified in the source address register (SAR) 24, and writes the data that is read out into the address specified in the destination address register (DAR) 25 (S105). This writing processing (S105) is repeated until when the data transfer counter (CR) 26 becomes 0 (S106). The data transfer counter (CR) 26 is decremented each time the writing processing is performed.

When the data transfer counter (CR) 26 becomes 0 (S106: 0), the arithmetic operation unit (ALU) 28 executes determination processing using the transfer data and the data register (DR) 27. When it is determined that there is no problem (S107: OK), the data transfer controller (DTC) 12 ends the operation (S109). Meanwhile, when it is determined that there is a problem (S107: NG), the data transfer controller (DTC) 12 starts the chain operation.

By performing a series of processing shown in FIG. 8, the data transfer controller (DTC) 12 is able to execute a series of processing using the serial communication interface without the intervention of the central processing unit (CPU) 10 as described above. More specifically, the data transfer controller (DTC) 12 is able to execute a series of processing including recognition of the transfer destination address and the number of transfer operations, a determination of a data transfer error, and a transfer of an error status without the intervention of the central processing unit (CPU) 10.

After the above processing of the data transfer controller (DTC) 12 is ended, the corresponding DTE bit is cleared to 0. In this state, an interrupt to the central processing unit (CPU) 10 is requested. The central processing unit (CPU) 10 performs processing such as a necessary arithmetic operation on the data stored in the RAM 14, and performs re-configuration of the data transfer information and the like.

Figure 9:
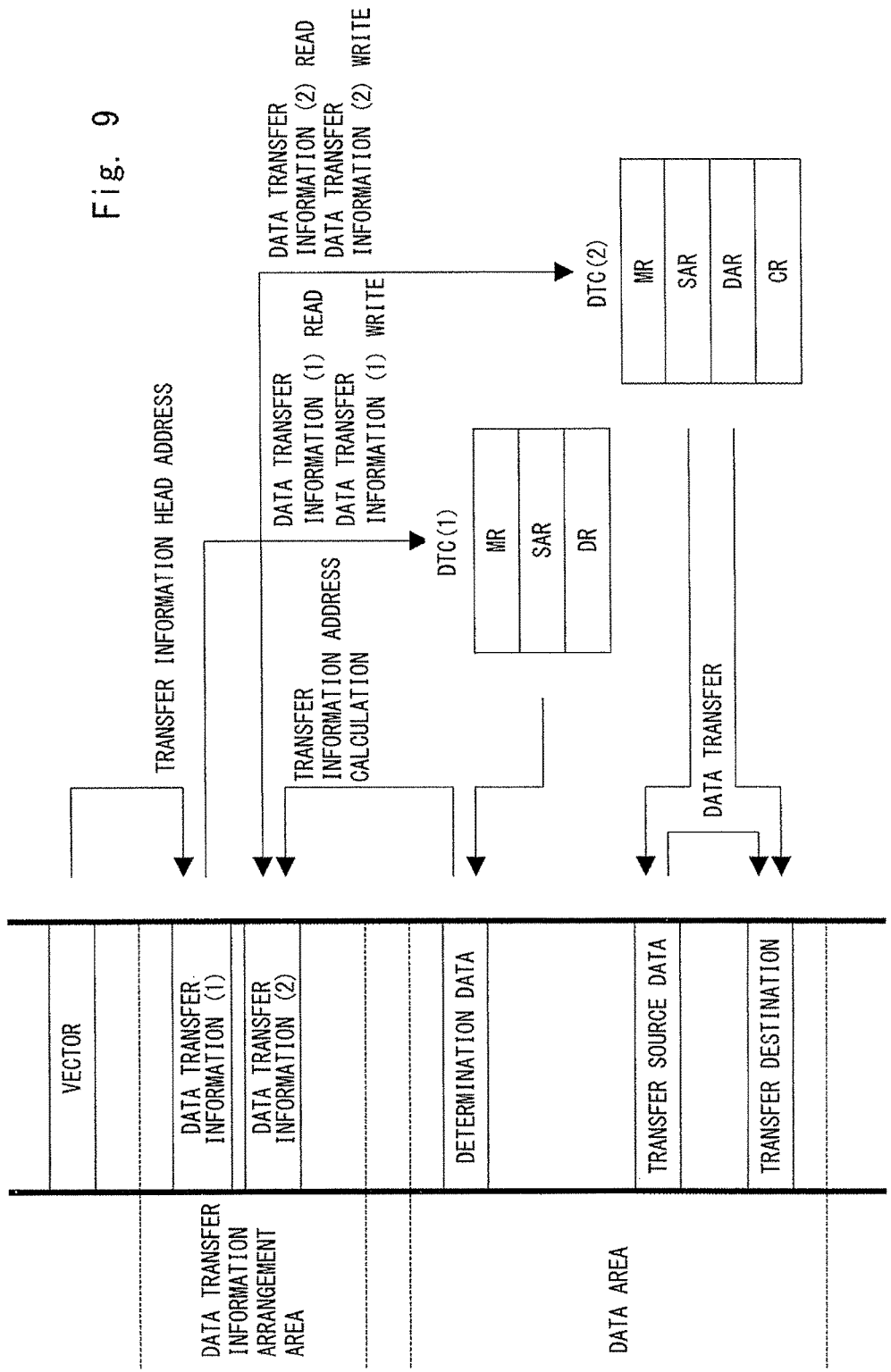
FIG. 9 is a diagram showing an operation in a switch mode of the microcomputer 1 according to the first embodiment.

Referring next to FIG. 9, an operation example in the switch mode will be described. FIG. 9 is an operation explanatory diagram showing a relation between the data transfer controller (DTC) 12 and the data transfer information arrangement area (e.g., RAM 14) when, the operation is performed in the switch mode. In this example, the SWM bit of the data transfer information (1) is set to 1.

The data transfer control block (DTCCNT) 21 sequentially reads out the data transfer information (1) from the data transfer information arrangement area. The data transfer control block (DTCCNT) 21 first writes the data read out from the data transfer information (1) into the mode register (MR) 23 to determine that the mode is the switch mode. Since the mode is the switch mode, the data transfer control block (DTCCNT) 21 writes the data read out from the data transfer information (1) into the source address register (SAR) 24 and the data register (DR) 27.

The data transfer control block (DTCCNT) 21 reads out data (hereinafter referred to as determination data in the description of the switch mode) from the address indicated by the source address register (SAR) 24. The data transfer control clock (DTCCNT) 21 performs data transfer using the data transfer information (1). Further, the arithmetic operation unit (ALU) 23 compares the determination data that is read out with the data in the data register (DR) 27.

When the determination data that is react out is within a predetermined range (e.g., data equal to or leas than that in the data register (DR) 27), the data transfer control block (DTCCNT) 21 generates the head data of the data transfer information (2) according to the determination data. The head data of the data transfer information (2) is generated by multiplying the determination data by 16 or adding the value obtained by shifting the determination data by 4 bits to the value after increment of the source address register (SAR) 24. The reason that the determination data is multiplied by 16 is to deal with the state in which the data transfer information is a 4 longwords, or 16 bytes. Accordingly, the data transfer information (2) that is read out next changes according to the value of the determination data. It is assumed that the set which is the candidates of the data transfer information (2) is set in the data transfer information arrangement area in advance. The SWM bit in each set is set to 0. The data transfer control block (DTCCNT) 21 carries out a data transfer using the data transfer information (2) that is set according to the determination data.

When the determination data that is read out is larger than the data in the data register (DR) 27, the data transfer control block (DTCCNT) 21 determines that the determination data is out of the processing range. The reason that the determination data is determined to be out of the processing range is that it is not realistic to set the set of the data transfer information (2) corresponding to all the pieces of determination data in the data transfer information arrangement area. Since the determination data is determined to be out of the processing range, a false operation when data other than the assumed determination data is read out can be prevented, and the error processing by the central processing unit (CPU) 10 can be performed without failure. Further, since it is also assumed that a part of the determination data is dealt by the processing by the central processing unit (CPU) 10, it is preferable that the part of the determination data is determined to be outside the range.

When it is determined that the determination data is out of the processing range, the data transfer control block (DTCCNT) 21 sets the DTE bit corresponding to the start factor is set to 0. The start factor is to be processed by the central processing unit (CPU) 10.

Even when the determination data is outside the predetermined range, as is similar to the case in which the determination data is within the predetermined range, the data transfer control block (DTCCNT) 21 may change the data transfer information (2) according to the determination data to perform the data transfer. In this case, the data transfer information (2) that is read out includes the contents of specifying the writing of the error status. Instead of detecting an error by the interrupt, the central processing unit (CPU) 10 detects an error by, for example, the execution of the operating system. It is therefore possible to simplify the program that operates the central processing unit (CPU) 10.

Figure 10:
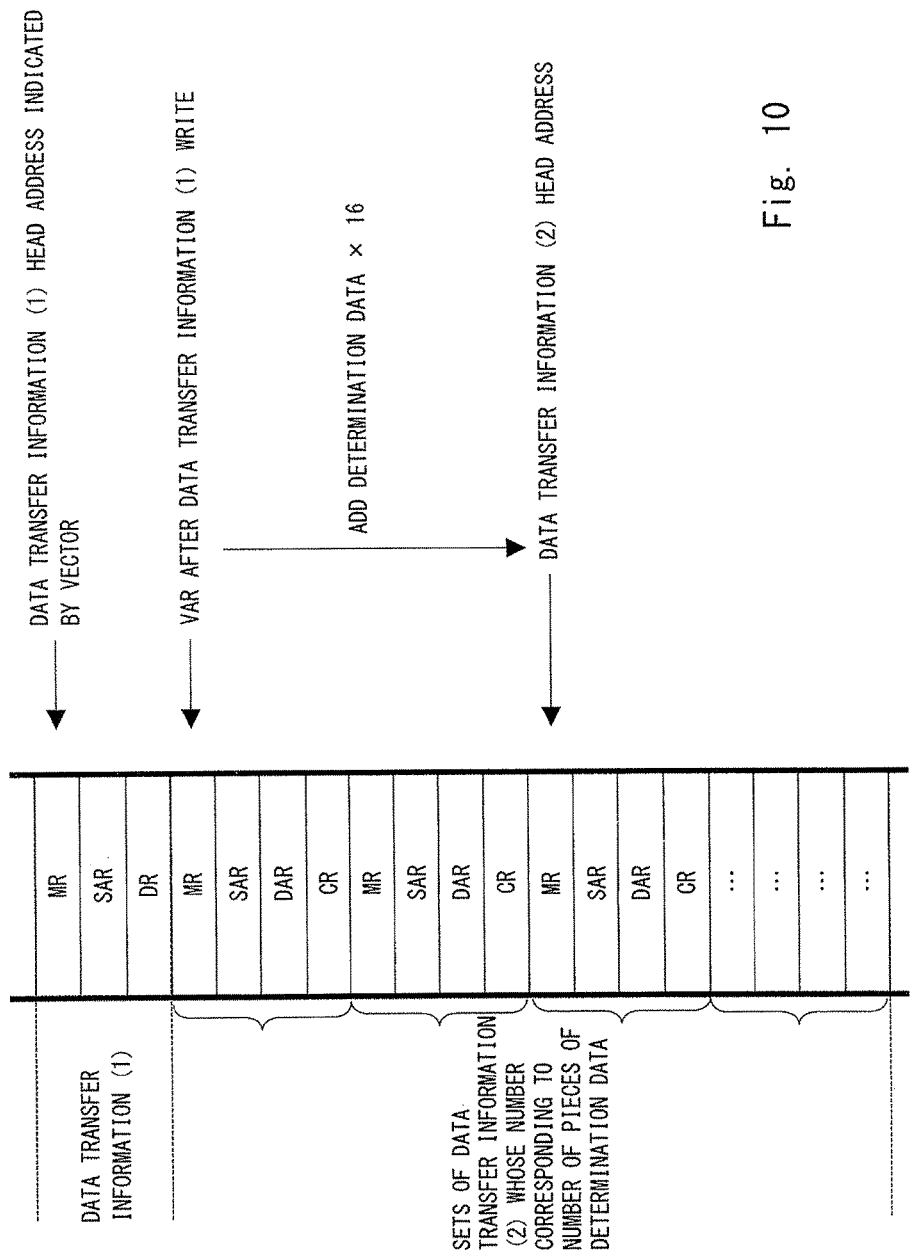
FIG. 10 is a diagram showing an operation in the switch mode of the microcomputer 1 according to the first embodiment.

Next, with reference to FIG. 10, the data transfer in the switch mode will further be described. FIG. 10 is a diagram showing a data transfer information arrangement area in the switch mode. The data group which is the candidates of the data transfer information (2) is set in advance by the processing in the central processing unit (CPU) 10 or the like.

The data transfer control block (DTCCNT) 21 reads out the data transfer information (1) using the vector address register (VAR) 29. The data transfer control block (DTCCNT) 21 performs a data transfer using the data transfer information (1). Further, the data transfer control block (DTCCNT) updates (increments) the vector address register (VAR) 29 when the data transfer information is written or read out. The data transfer control block (DTCCNT) 21 adds the value obtained by multiplying the determination data read out based on the data transfer information (1) by 16 and the value of the vector address register (VAR) 29 to generate the head address of the data transfer information (2). While the determination data is multiplied by 16 (or 4-bit shift) in the above example, the value of the determination data may be adjusted in advance so that the value can be directly added.

Figure 11:
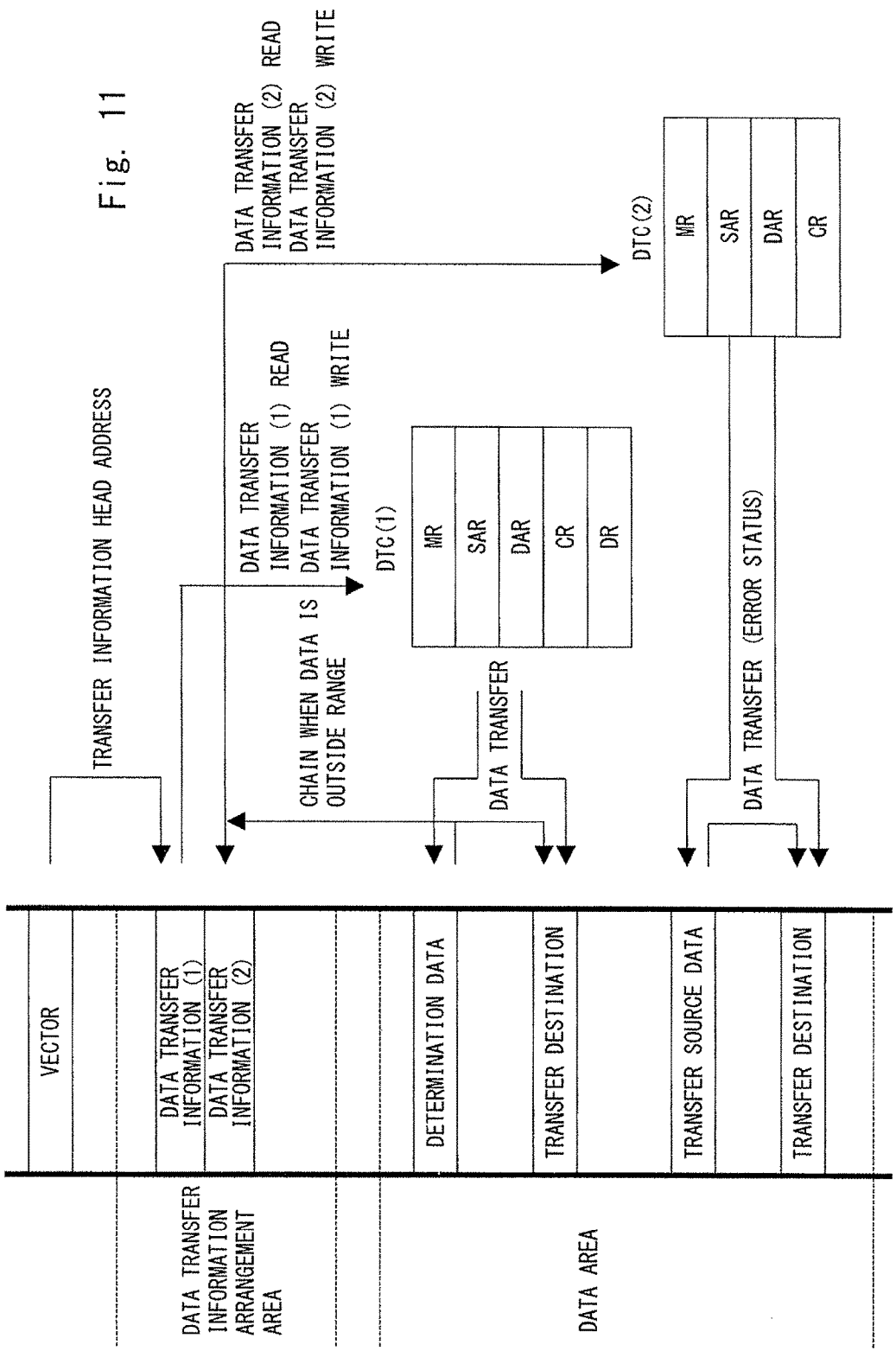
FIG. 11 is a diagram showing an operation in a test transfer mode of the microcomputer 1 according to the first embodiment.

Referring next to FIG. 11, an operational example in the test transfer mode will be described. FIG. 11 is an operation explanatory diagram showing a relation between the data transfer controller (DRC) 12 and the data transfer information arrangement area (e.g., RAM 14) when the operation is performed in the test transfer mode. In this example, the TSM bit of the data transfer information (1) is set to 1.

The data transfer control block (DTCCNT) 21 sequentially reads out the data transfer information (1) from the data transfer information arrangement area. The data transfer control block (DTCCNT) 21 first writes the data read out from the data transfer information (1) of the data transfer information arrangement area into the mode register (MR) 23 to determine that the mode is the test transfer mode. Since the mode is the test transfer mode, the data transfer control block (DTCCNT) 21 reads out data from the data transfer information (1) of the data transfer information arrangement area to write the data into the source address register (SAR) 24, the destination address register (DAR) 25, the data transfer counter (CR) 26, and the data register (DR) 27.

The data transfer controller (DTC) 12 executes a data transfer in a similar way as a normal data transfer. Further, the arithmetic operation unit (ALU) 28 compares the transfer data (data that is read out from the address indicated by the source address register (SAR) 24) with the data in the data register (DR) 27. When the transfer data is larger than the data in the data register (DR) 27, for example, the data transfer control block (DTCCNT) 21 determines that the determination data is outside the specified range.

When the determination data is within the specified range, the data transfer controller (DTC) 12 ends the operation only with the processing of the data transfer information (1). When the determination data is outside the specified range, the data transfer controller (DTC) 12 reads out the data transfer information (2) stored adjacent to the data transfer information (1) by the chain operation. The data transfer controller (DTC) 12 executes the data transfer using the data transfer information (2). The data transfer information (2) is used, for example, to write the error status. Accordingly, the central processing unit (CPU) 10 is able to know the error status regardless of the interrupt.

Then the determination data is outside the specified range, the data transfer controller (DTC) 12 may set the DTE bit corresponding to the start factor to 0. Accordingly, the control by the central processing unit (CPU) 10 is executed.

Figure 12:
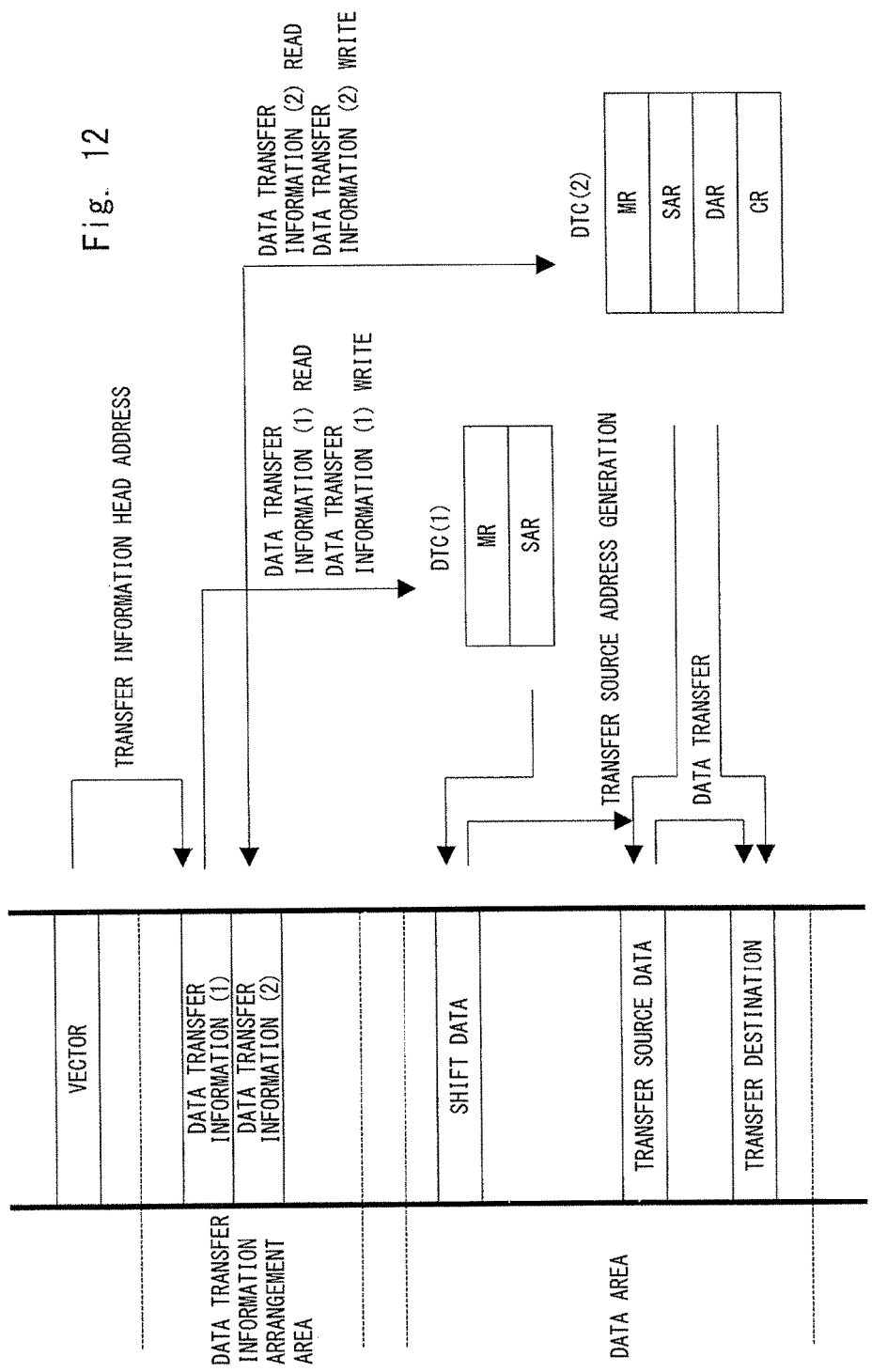
FIG. 12 is a diagram showing an operation in a shift mode of the microcomputer 1 according to the first embodiment.
Figure 13:
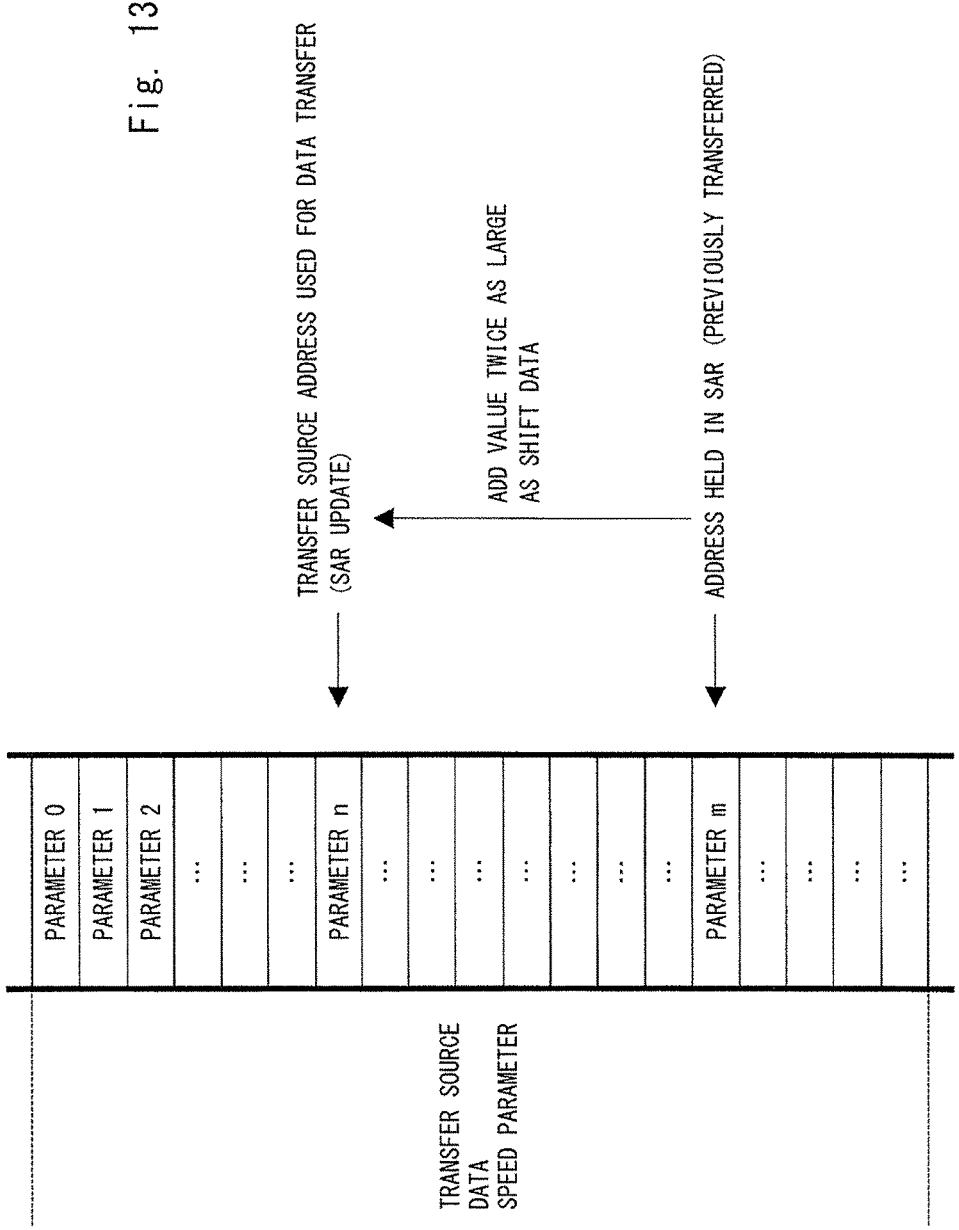
FIG. 13 is a diagram showing an operation in the shift mode of the microcomputer 1 according to the first embodiment.

Referring next to FIG. 12, the operational example in the shift mode will be described. FIG. 13 is an operation explanatory diagram showing a relation between the data transfer controller (DTC) 12 and the data transfer information arrangement area (e.g., RAM 14) when the operation is performed in the test transfer mode. In this example, the SFM bit of the data transfer information (1) is set to 1 and the SEL bit is set to 0.

The data transfer control block (DTCCNT) 21 sequentially reads out the data transfer information (1) from the data transfer information arrangement area. The data transfer control block (DTCCNT) 21 first writes the data read out from the data transfer information (1) of the data transfer information arrangement area in the mode register (MR) 23 to determine that the mode is the shift mode. Since the mode is the shift mode, the data transfer control block (DTCCNT) 21 writes the data read out from the data transfer information (1) of the data transfer information arrangement area in the source address register (SAR) 24.

The data transfer control block (DTCCNT) 21 stores the data read out from the address indicated by the source address register (SAR) 24 (in the following description of the shift mode, also called shift data) in the data register (DR) 27. The data transfer control block (DTCCNT) 21 saves the mode information of the data transfer information (1) and the shift data in the data transfer function controller (FC) 20. When the data transfer information is read out or written, the vector address held by the vector address register (VAR) 29 is incremented. In summary, the head address of the data transfer information (2) stored in the adjacent address of the data transfer information (1) is stored in the vector address register (VAR) 72.

The data transfer control block (DTCCNT) 21 refers to the vector address register (VAR) 27 to read out data of the data transfer information (2), and then stores the data that is read out in each of the registers 23 to 27. The data transfer control block (DTCCNT) 21 reads out, when data transfer is executed using the data transfer information (2), the shift data or the shift mode information saved in the data transfer function controller (FC) 20. The arithmetic operation unit (ALU) 28 multiplies the shift data that is read out by 1, 2, or 4 according to the size of the transfer data. Alternatively, the arithmetic operation unit (ALU) 28 shifts the shift data that is read out by 0 to 2 bits according to the transfer data size. The arithmetic operation unit (ALU) 28 adds the shift data in which a multiplication or a bit shift is performed and data in the source address register (SAR) 24 to overwrite the addition value in the source address register (SAR) 24. In summary, the transfer source data specified in the data transfer information (2) is adjusted using the shift data. The data transfer control block (DTCCNT) 21 then executes data transfer processing according to the mode register (MR) 23. While the example in which the transfer source data is adjusted using the shift data has been described in the above description, other data in the data transfer information (e.g., transfer destination address) may be adjusted using the shift data.

Note that a configuration in which the data transfer information (1) and the data transfer information (2) are included in one data transfer information may be employed. In summary, the data transfer information may have a configuration of including two pieces of data read out in the source address register (SAR) 24. In this case, a configuration needs to be changed so that the source address register (SAR) 24 is able to store the capacity twice as large as that of the configuration shown in FIG. 2.

Referring next to FIG. 13, one example of specification of the transfer destination address in the shift mode will be described. In the following description, an example in which the microcomputer 1 controls data that specifies the speed of a motor will be discussed. It is assumed that parameters used for control of the motor are stored in the ROM 13. These parameters have a data length of, for example, 16 bits, and the speed increases in the ascending order (for example, the parameter 2 specifies a higher-speed operation than the parameter 1). Since the parameter has a 16-bit length, the shift data (i.e., parameter) is doubled and then an addition is performed in the above addition processing.

When an initial setting is performed, the setting is performed so that the parameter 0 is read out. When it is required to drive the motor, the address of the parameter read out using the shift data of the data transfer information (1) is changed, and for example, the parameter m is read out. When it is determined that the acceleration is sufficient as a result of the monitoring of the state of the motor by another timer or an analog input, negative shift data is added. In summary, the state of the motor is monitored and the interrupt is occurred at predetermined time intervals, and it is adjusted which shift data is read out due to the interrupt. The addition result may not be reflected in the source address register (SAR) 24. The deviation from an address which serves as a reference of the speed parameter storage region may be specified by the data transfer information (1).

For example, the state of the motor that controls the microcomputer 1 is converted by an A/D converter. The operation of the A/D converter is performed at predetermined time intervals, and the data transfer controller (DTC) 12 is controlled using a conversion end interrupt. The conversion result by the A/D converter may be referred as the shift data. It is thus possible to supply the appropriate speed data to the timer that drives the motor.

The above description is the operation of the data transfer controller (DTC) 12 in each mode, and the outline of the processing will be described again. The data transfer controller (DTC) 12 first reads out data according to the transfer mode from the data transfer information to the mode register (MR) 23 to analyze the data. According to this analysis, the data transfer controller (DTC) 12 knows which transfer mode (e.g., accumulation mode, switch mode, address load mode) has been set. The data transfer controller (DTC) 12 then changes at least one of the transfer source address and the transfer destination address (e.g., address load mode, shift mode), the number of transfer operations (e.g., counter load mode), a data transfer set (e.g., switch mode) used for the next data transfer according to the transfer mode that is set. The data transfer controller (DTC) 12 performs the change using the transfer data (data that is read out from the transfer source address). In the counter load mode, for example, the data transfer controller (DTC) 12 sets the data that is read out according to the transfer source address from the communication module or the like as the number of transfer operations.

Figure 14:
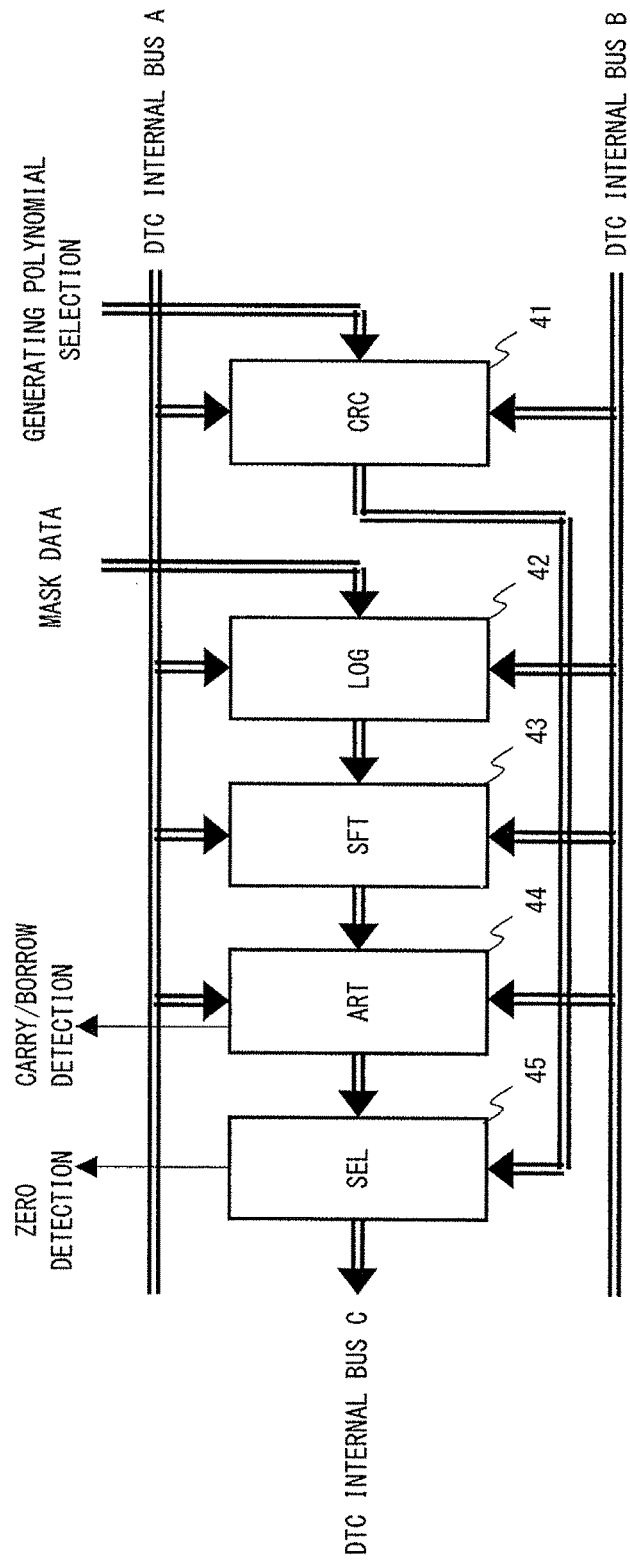
FIG. 14 is a block diagram showing a configuration of an arithmetic operation unit (ALU) 28 according to the first embodiment.

Next, a detailed configuration example of the arithmetic operation unit (ALU) 28 will foe described with reference to FIG. 14. FIG. 14 is a block diagram showing a configuration of the arithmetic operation unit (ALU) 28. The arithmetic operation unit (ALU) 28 includes a CRC operation unit (CRC) 41, a logical operation unit (LOG) 42, a shifter (SFT) 43, an arithmetic operation unit (ART) 44, and an output selector (SEL) 45. The arithmetic operation unit (ALU) 28 includes a plurality of internal buses. The arithmetic operation unit (ALT) 28 includes, in this example, DTC internal buses A, B, and C.

The CRC operation unit (CRC) 41 receives, for example, the read data (data that is read out from the data transfer information arrangement area) from the DTC internal bus A, the read data from the data register (DR) 27 from the DTC internal bus B, and a generating polynomial selection signal from the data transfer control block (DTCCNT) 21. The CRC operation unit (CRC) 41 performs the arithmetic operation specified using these inputs to supply the operation result to the output selector (SEL) 45.

The logical operation unit (LOG) 42 receives, for example, the read data (data that is read out according to the data transfer information) from the DTC internal bus A, the read data from the data register (DR) 27 from the DTC internal bus B, and the mask data from the data transfer control block (DTCCNT) 21. The logical operation unit (LOG) 42 receives the control signal based on bits or the like (e.g., OP3 to OP0). The logical operation unit (LOG) 42 is therefore able to mask a predetermined bit for the input from each of the DTC internal buses A and B. The logical operation unit (LOG) 42 executes the arithmetic operation that is specified, to supply the operation results to the shifter (SFT) 43.

The shifter (SFT) 43 receives the data output from the logical operation unit (LOG) 42 and the control signal from the data transfer control block (DTCCNT) 21 (e.g., control signal corresponding to the data transfer size). The shifter (SFT) 43 executes an arithmetic operation according to the input to output the operation results to the arithmetic operation unit (ART) 44.

The arithmetic operation unit (ART) 44 receives the output data from the logical operation unit (LOG) 42 through the shifter (SFT) 43, the control signal from the data transfer control block (DTCCNT) 21 and the like. The arithmetic operation unit (ART) 44 executes an arithmetic operation according to the input control signal to supply the operation results to the output selector (SEL) 45. The arithmetic operation unit (ART) 44 detects a carry/borrow in this arithmetic operation to notify the data transfer control block (DTCCNT) 21 of the carry/borrow.

The output selector (SEL) 45 receives the operation results of the CRC operation unit (CRC) 41, the operation results of the arithmetic operation unit (ART) 44, the control signal from the data transfer control block (DTCCNT) 21 and the like. The output selector (SEL) 45 executes selection processing according to the input control signal to output the selection result to the arithmetic operation request source through the DTC internal bus C.

Figure 15:
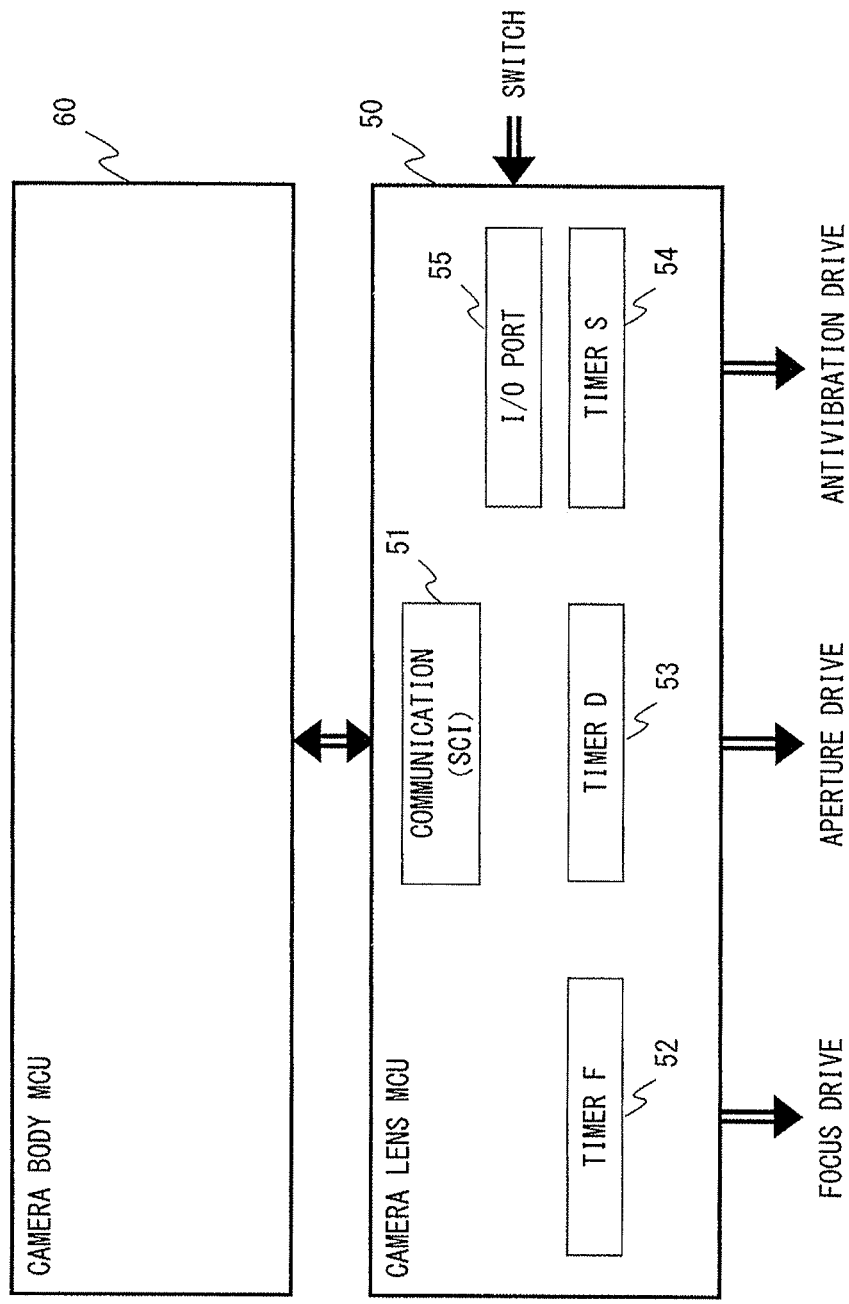
FIG. 15 is a block diagram showing an application example of the microcomputer 1 according to the first embodiment.

Referring next to FIG. 15, a case in which the microcomputer 1 is applied to a camera will be described. A camera lens MCU 50 has the configuration and functions of the microcomputer 1 described above. Further, the camera lens MCU 50 includes a communication module (SCI) 51 (corresponding to the communication module 17 in FIG. 1), a timer F 52, a timer D 53, a timer S 54, and an input/output port (I/O) 55 (corresponding to the input/output port (I/O) 19 in FIG. 1). The timer F 52, the timer D 53, and the timer S 54 correspond to the timer 16 shown in FIG. 1. The camera lens MCU 50 receives a command from a camera body MCU 60. This command is written into a storage device of the camera lens MCU 50 as the data transfer information, and the data transfer controller (DTC) 12 is started, whereby various processing are executed.

The timer F 52, the timer D 53, and the timer S 54 are used to control the focus, the aperture, and antivibration, respectively. A switch input such as allowance of an automatic focus and allowance of antivibration is input from the input/output port (I/O) 55. The communication module (SCI) 51 is communication means having one line such as a serial communication interface, and the data transfer information as a command is supplied to the camera lens MCU 50 from the camera body MCU 60. The interface between the camera lens MCU 50 and the camera body MCU 60 is defined by a lens mount. A response from the camera lens MCU 50 (data transmission from the camera lens MCU 50 to the camera body MCU 60) is also performed through the communication means.

The data transfer controller (DTC) 12 in the camera lens MCU 50 is started according to the reception end interrupt of the communication means. The data transfer controller (DTC) 12 reads out, for example, the data transfer information to operate in a switch mode, and switches the transfer destination address using the determination data of the switch mode described above. In this way, the data transfer controller (DTC) 12 writes data in the transfer destination address that is specified (e.g., timer F 52, timer D 53, timer S 54, I/O port 55).

The camera lens MCU 50, i.e., the microcomputer 1, is able to operate in the aforementioned shift mode, and read out an appropriate parameter from the data transfer information arrangement area including the RAM 14 to transfer the appropriate parameter. As described above, in the shift mode, it is possible to change the parameter to be read out according to the state (in the above example, the state of the motor). The parameter can be changed according to the state, which is suitable for the feedback control.

The control of the timer S 54 is performed using the data transfer information (2) (FIG. 10) of the switch mode as described above. Specifically, the data transfer controller (DTC) 12 selects the data transfer information (2) for controlling the timer S 54 in the case of a required command using the data transfer information (1) (FIG. 10) and executes the data transfer using the data transfer information (2). For example, the data transfer controller (DTC) 12 writes data into the timer S 54 by the command input from the camera body MCU 60 corresponding to, for example, half pressing of a shutter. At the same time, the data transfer information (2) (FIG. 10) for controlling the timer S 54 may be used to write data at predetermined time intervals due to the interrupt by another interval timer. In summary, such a configuration in which the antivibration control to the camera is executed at predetermined time intervals may be employed.

Next, a case in which a command regarding a status request is input will be described. A command that requests to write a predetermined state (e.g., state of a hand shake correction enable switch) in a predetermined register from the camera body MCU 60 is input to the camera lens MCU 50. The data transfer controller (DTC) 12 operates in the switch mode to select the the data transfer information (2) (FIG. 10) which is the target to be read out. The data transfer controller (DTC) 12 then reads out the status data of the functional block (e.g., input/output (I/O) port 55) that is specified using the data transfer information (2) (FIG. 10) to write the status data in the transmission data register of the communication module (SCI) 51. Since the status data is written in the transmission data register, the communication module (SCI) 51 operates, and the states data written in the transmission data register is transmitted to the camera body MCU 60. The above processing is performed by the data transfer controller (DTC) 12, which eliminates the data transfer control by the central processing unit (CPU) 10. In summary, the processing load of the central processing unit (CPU) 10 is reduced.

In prior microcomputers, a central processing unit (CPU) analyzes a command every time a reception is ended. Meanwhile, the data transfer controller (DTC) 12 according to this embodiment typically executes command analysis and the like that have been executed by the central processing unit (CPU) 10 in the prior techniques. The central processing unit (CPU) 10 may make a transition to the low power consumption mode (sleep, standby or the like) during the operation of the data transfer controller (DTC) 12. The data transfer controller (DTC) 12 has a smaller logic size than that of the central processing unit (CPU) 10 and is able to perform high-speed processing. The central processing unit (CPU) 10 makes a transition to the low power consumption mode and only the data transfer controller (DTC) 12 operates, thereby being able to improve the effect of the low power consumption. Needless to say, low power consumption is important in a camera system and the like driven by a battery.

Figure 16:
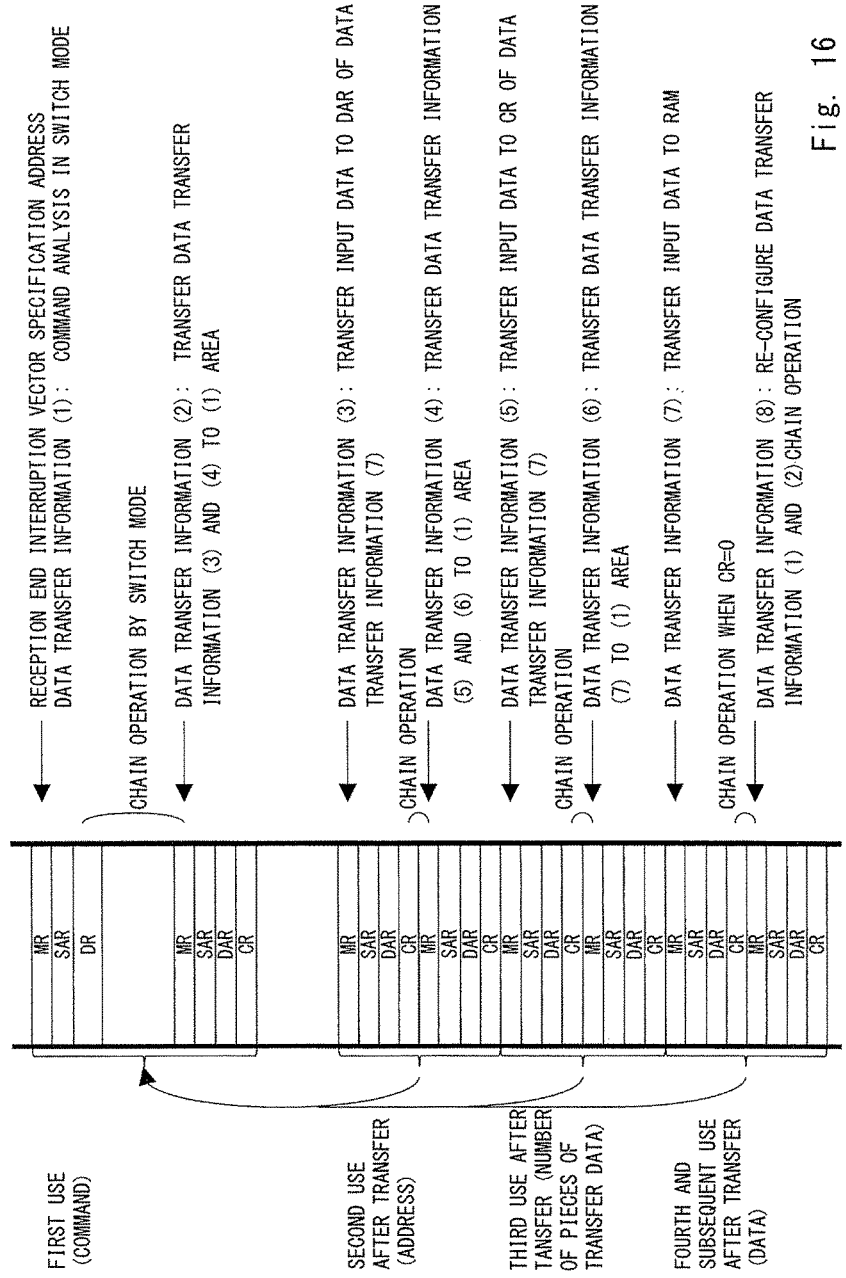
FIG. 16 is a diagram showing a command analysis example of the microcomputer 1 according to the first embodiment.

Referring next to FIG. 16, a specific example of the data transfer in the configuration shown in FIG. 15 will be described. It is assumed that the camera body MCU 60 transmits the command type, the transfer destination address, the comber of pieces of transfer data, and the transfer data in this order. Hereinafter, the operation of each processing unit of the microcomputer 1 in the camera lens MCU 1 will be described.

Before the reception of the command is started, data transfer information (1) and (2) that specify the switch mode in the reception end interrupt vector specification address (address that is read out when a reception end interrupt occurs) in the data transfer information address area are set. Further, data transfer information (3) to (8) are set in the address area different from that of the data transfer information (1) and (2). These data transfer information are set based on the data held in the ROM 13.

Due to the command reception end interrupt, the start request of the data transfer controller (DTC) 12 is performed. In accordance therewith, the data transfer controller (DTC) 12 reads out data from the data transfer information (1) in the data transfer information address area to write the data into the mode register (MR) 23, to determine that the operation is performed in the switch mode. The data transfer controller (DTC) 12 reads out the determination data from the data transfer information (1) to determine whether the reception command is a data reception command by determining whether the determination data is within the specified range described above. When the reception command is the data reception command (within the range), the data transfer controller (DTC) 12 reads out the data transfer information (2) to write the data transfer information (2) into the registers 23 to 27. The data transfer controller (DTC) 12 transfers the data transfer information (3) and (4) to the reception end interrupt vector specification address (address that is read out when a reception end interrupt occurs) using the address indicated by the source address register (SAR) 24 (in this example, the arrangement address of the data transfer information (3) and (4)).

The data transfer controller (DTC) 12 is started by the second command reception end interrupt. The data transfer controller (DTC) 12 reads out the data transfer information (3) from the reception end interrupt vector specification address. The data transfer controller (DTC) 12 then writes the transfer data that is read out using the data transfer information (3) into the destination address register (DAR) 25 of the data transfer information (7). Further, the data transfer controller (DTC) 12 performs the chain operation (i.e., data transfer using the data transfer information (4)) according to the data transfer information (3). According to the chain operation, the data transfer controller (DTC) 12 transfers the data transfer information (5) and (6) to the reception end interrupt vector specification address (address that is read out when a reception end interrupt occurs).

The data transfer controller (DTC) 12 is started by the third command reception end interrupt. The data transfer controller (DTC) 12 reads out the data transfer information (5) from the reception end interrupt vector specification address. The date transfer controller (DTC) 12 then writes the transfer data that is read out using the data transfer information (5) in the data transfer counter (CR) 26 of the data transfer information (7). Further, the data transfer controller (DTC) 12 performs the chain operation according to the data transfer information (5). Due to the chain operation, the data transfer controller (DTC) 12 transfers the data transfer information (7) and (8) to the reception end interrupt vector specification address (address that is read out when the reception end interrupt occurs).

The data transfer controller (DTC) 12 is started by the fourth command reception end interrupt. The data transfer controller (DTC) 12 reads out the data transfer information (7) from the reception end interrupt vector specification address. The data transfer controller (DTC) 12 then transfers the transfer data that is read out using the data transfer information (7) to the address indicated by the destination address register (DAR) 25. This transfer is repeated for the number of times specified by the data transfer counter (CR) 26.

The NXTE0 bit of the mode register (MR) 23 of the data transfer information (7) is set to 1. When the data transfer is executed for the specified number of times, the data transfer using the data transfer information (8) is performed by the chain operation. Due to the transfer using the data transfer information (8), an interrupt request occurs, for example, in the central processing unit (CPU) 10.

As described above, the data transfer in which the switch mode, the chain mode and the like are combined is performed, so that the data transfer controller (DTC) 12 is also able to execute the data transfer where the command type, the transmission destination address, the number of pieces of transfer data are dynamically changed.

Figure 17:
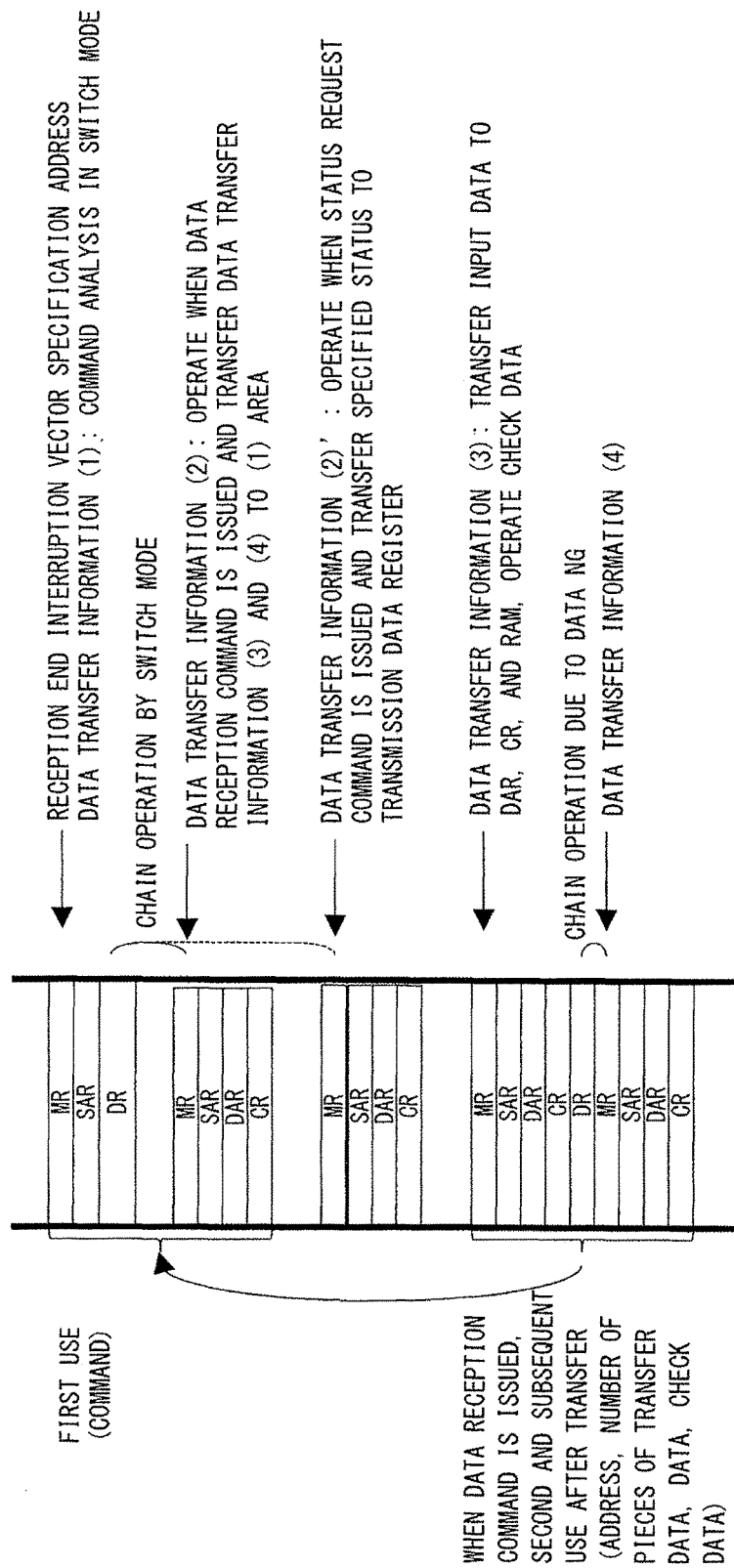
FIG. 17 is a diagram showing the command analysis example of the microcomputer 1 according to the first embodiment.

FIG. 17 describes a second specific example of the data transfer in the configuration shown in FIG. 15. FIG. 17 is a data example of the data transfer that is similar to that shown in FIG. 16. In FIG. 17, the ACM bit, the ALM bit, the CLM bit, the NXTS bit, and the NXTE0 bit of the data transfer information (3) are set to 1.

The transfer processing regarding the first command reception end interrupt is similar to the processing shown in FIG. 16. The second command reception end interrupt is input to the data transfer controller (DTC) 12. The data transfer controller (DTC) 12 reads out the data transfer information (3) from the reception end interrupt vector specification address. Since the address load mode (AML=1) and the counter load mode (CLM=1) are set, the data transfer controller (DTC) 12 updates the source address register (SAR) 24 and the data transfer counter (CR) 26 in the procedure shown in FIG. 8. The data transfer controller (DTC) 12 executes the data transfer for the number of times indicated by the data transfer counter (CR) 26. The NXTE0 bit of the mode register (MR) 23 of the data transfer information (3) is set to 1. In this way, when the data transfer is carried out for a specified number of times, the data transfer using the data transfer information (4) is performed by the chain operation. Due to the transfer using the data transfer information (8), an interrupt request occurs, for example, in the central processing unit (CPU) 10.

Further, FIG. 17 shows another example of the data transfer. The data transfer controller (DTC) 12 is started by the first command reception end interrupt. In accordance therewith, the data transfer controller (DTC) 12 writes the data that is read out from the data transfer information (1) in the mode register (MR) 23, to determine that the operation is performed in the switch mode. The data transfer controller (DTC) 12 reads out the determination data of the data transfer information (1) to perform determination processing, to read out data transfer information (2)'. The data transfer information (2)' specifies to write the specified status into the transmission data register. The data transfer controller (DTC) 12 executes a data transfer using the data transfer information (2)'. The data transfer controller (DTC) 12 reads out, for example, the status data of the functional block (e.g., input/output (I/O) port 55) specified using the data transfer information (2)' to write the status data in the transmission register of the communication module (SCI) 51.

Next, the effects of the microcomputer 1 according to this embodiment will be described. The data transfer controller (DTC) 12 determines the mode from the data transfer information that is read out to change at least one of the transfer source address, the transfer destination address, and the number of transfer operations according to the mode. In summary, the data transfer controller (DTC) 12 performs processing that is generally performed by the central processing unit (CPU) 10 according to the data that is read out, to perform a data transfer. Accordingly, the frequency of the occurrence of the interrupt request to the central processing unit (CPU) 10 decreases, which eliminates exception processing, operations of saving to a stack/recovering from a stack, execution of a recovery instruction and the like when the central processing unit (CPU) 10 executes interrupt processing. Since the processing load of the central processing unit (CPU) 10 is reduced, the processing speed of the microcomputer 1 can be increased and the responsiveness can be improved. Further, the microcomputer 1 is able to execute a flexible data transfer according to the application system.

Further, as is similar to the case in which the determination data is outside the range in the test transfer mode, the data transfer controller (DTC) 12 executes the chain operation, thereby capable of executing error processing and the like. It is therefore possible to reduce the error processing or the like executed by the central processing unit (CDC) 10. Further, the central processing unit (CPU) 10 may have a configuration of executing only the processing which is hard to be achieved by a dedicated hardware (e.g., data transfer controller (DTC) 12). Accordingly, it is possible to reduce (simplify) the program executed by the central processing unit (CPU) 10.

The data transfer controller (DTC) 12 has a configuration of reading out only the necessary data according to the mode. For example, the data transfer controller (DTC) 12 writes the data that is read out only in the mode register (MR) 23 and the source address register (SAR) 24 in the shift mode. As described above, only the necessary data is read out or written, thereby capable of increasing the speed of processing.

The data transfer controller (DTC) 12 has a smaller logic size than that of the central processing unit (CPU) 10. In summary, the data transfer controller (DTC) 12 consumes less power than that in the central processing unit (CPU) 10. Further, since the data transfer controller (DTC) 12 is able to perform a data transfer and the like in high speed, the data transfer can be executed by fewer number of clocks, thereby contributing to the low power consumption. Since the number of processes executed by the data transfer controller (DTC) 12 is increased, power consumption of the whole microcomputer 1 can be suppressed.

Further, the data transfer controller (DTC) 12 may save a part of the data transfer information in the data transfer function controller (FC) 20, and the saved data can be referred in the following transfer processing. In this way, it is possible to achieve the above shift mode operation and complicated operations in which a plurality of data transfer operations are combined. In short, the data transfer controller (DTC) 12 is able to achieve flexible operations.

Further, the microcomputer 1 stores the data transfer information that is read out by the data transfer controller (DTC) 12 in the storage device (preferably, the RAM 14). The advantages that the RAM 14 holds the data transfer information are as follows.

(a) The number of data transfer operations can be increased. In the method in which the hardware of the data transfer apparatus itself holds all the data transfer information (e.g., DMA controller method), the number of data transfer operations is restricted by the hardware that is implemented. Meanwhile, in the method of storing the data transfer information in the RAM 14 where the application is not limited as described above, it is easy to increase the number of data transfer operations and is possible to deal with various use methods by a user.

(b) The microcomputer 1 according to this embodiment has a configuration of switching whether to issue the interrupt request to the central processing unit (CPU) 10 according to the interrupt factor as described above or to issue the data transfer request to the data transfer controller (DTC) 12. Accordingly, the microcomputer 1 according to this embodiment is able to perform a data transfer in response to a large number of interrupts and the occurrence of events compared to the method of implementing the selection of the start factor as the control register configuration of the data transfer apparatus itself and the interface of the microcomputer (e.g., DMA controller method).

(c) It is possible to increase the number of data transfer operations executed when one data transfer operation such as the chain operation is started. Accordingly, a different type of data transfer operations can be executed in combination. For example, the normal data transfer and the error writing can be successively executed.

(d) It is possible to change, increase, or decrease the configuration of the data transfer information.

(e) The data transfer controller (DTC) 12 according to this embodiment holds only the data related to one data transfer operation. In summary, the size of the hardware of the data transfer controller (DTC) 12 is small. The fifth advantage is that, even when a function is added to the data transfer controller (DTC) 12 by hardware, an increase in the physical size of the whole microcomputer 1 can be suppressed.

(f) As described above, the data transfer controller (DTC) 12 according to this embodiment reads out the necessary data transfer information by itself to use the data transfer information, and writing is not performed by the central processing unit (CPU) 10. The sixth advantage is that there is no need to consider complicated operation conditions such as a writing conflict from the central processing unit (CPU) 10 which is required in the DMA controller method. It is therefore possible to prevent an increase in the physical size.

While the present invention achieved by the present inventor has been specifically described based on the embodiment, the present invention is not limited to the embodiment already stated above and may be changed in various ways without departing from the spirit of the present invention.

For example, while the data transfer information has been described as a variable length of 32-bit units in the above description, this unit may be set to an arbitrary size. Further, the method of specifying the data transfer function may be arbitrarily changed. The number of bits in each address register (SAR, DAR) described above is not limited to 32 bits and may be changed according to the address space of the single-chip microcomputer or the central processing unit (CPU) 10. When the address space is 16 M bytes, the address register stated above may be 24 bits.

The internal configurations of the interrupt controller (INT) 11, the data transfer controller (DTC) 12, the arithmetic operation unit (ALU) 28 and the like may be changed as appropriate.

Further, the program executed by the central processing unit (CPU) 10 may be arranged in the ROM 13 or may be arranged in an external memory of the microcomputer 1. In a similar way, the work area of the central processing unit (CPU) 10 may not be the RAM 14, and may be the external memory of the microcomputer 1. In this case, the microcomputer 1 may not include the ROM 13 or the RAM 14 therein. Further, the aforementioned data transfer information may be arranged not in the RAM 14 but in the external memory.

The microcomputer 1 may include a data transfer apparatus such as a so-called Direct Memory Access (DMA) controller in addition to the data transfer controller (DTC) 12. Further, the microcomputer 1 may have a configuration including the data transfer controller (DTC) 12 and the DMA controller as one functional module.

While the description has been made using the configuration in which the data transfer information is read out from or write in the storage device such as the RAM 14 in the aforementioned description, it is possible to cause the so-called DMA controller to execute the data transfer according to the state transition in FIG. 5. In summary, it is possible to apply the data transfer method performed according to the mode determination using the data transfer information stated above to an arbitrary data transfer apparatus. One example of the data transfer apparatus includes the data transfer controller (DTC) 12 and the DMA controller.

While the description of the details of the right of bus use and the bus operation such as a wait has been omitted, they may be implemented as necessary.

The configuration of the microcomputer 1 is not limited to the above configuration, and the configuration of the functional block embedded therein may be changed as appropriate. For example, the central processing unit (CPU) 10 and the data transfer controller (DTC) 12 may be mounted on one chip as a single-chip configuration, or the central processing unit (CPU) 10 and the data transfer controller (DTC) 12 may be mounted on different chips. In other words, the central processing unit (CPU) 10 may be mounted on a first chip and the data transfer controller (DTC) 12 may be mounted on a second chip. Further, the aforementioned data transfer controller (DTC) 12 may be mounted on another semiconductor integrated circuit (e.g., semiconductor integrated circuit such as a digital signal processor (DSP)).

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising a central processing unit and a data transfer apparatus other than the central processing unit that performs data transfer processing,
   wherein the data transfer apparatus comprises:
   a mode register, the mode register stores transfer mode information indicating contents of control of a data transfer;
   a data transfer control block, the data transfer control block switches data transfer processing according to the mode register;
   an arithmetic operation unit;
   a set of registers that stores a transfer information set, the transfer information set comprising a transfer source address, a transfer destination address, transfer count data that specifies the number of transfer operations, and data information; and
   a plurality of internal buses,
   wherein the data transfer apparatus carries out a data transfer based on the transfer information set,
   wherein the arithmetic operation unit reads out data from each of the set of registers through the plurality of internal buses,
   wherein the data transfer control block changes at least one of the transfer source address, the transfer destination address, the number of transfer operations, and the transfer information set to be used in a next data transfer according to data read out from the transfer source address without using the central processing unit, and
   wherein the central processing unit makes a transition to an operation in a low power consumption state while the data transfer apparatus performs the data transfer.

2. The semiconductor device according to claim 1, wherein the semiconductor device comprises a storage device, the storage device storing a plurality of transfer information sets and being readable and writable by the data transfer apparatus and the central processing unit.

3. The semiconductor device according to claim 1, wherein the data transfer apparatus repeatedly executes a unit of processing for the number of times indicated by the transfer count data in the transfer information set, the unit of processing comprising processing of reading out the transfer information set from the storage device, performing a predetermined data transfer based on the transfer information set, and then writing back the transfer information set into the storage device.

4. The semiconductor device according to claim 2, wherein the data transfer apparatus first reads out the transfer mode information of the transfer information set stored in the storage device in the register, and then reads out another piece of data of the transfer information set according to the transfer mode information to write the data into the register.

5. The semiconductor device according to claim 1, wherein:
   the data transfer apparatus comprises a data transfer function controller that saves the data information in the register, and the data transfer apparatus saves a part of the transfer information set from the register in the data transfer function controller, and changes at least one of the number of transfer operations, a transfer destination address, and a transfer source address of the data transfer information that is read out later using the data saved in the data transfer function controller.

6. The semiconductor device according to claim 1, wherein:
the transfer mode information comprises test transfer mode information, the test transfer mode information specifying whether the mode is a test transfer mode that performs a test transfer, and
the data transfer apparatus compares, when the test transfer mode is specified, the data that is read out based on the transfer source address with the data information in the register, and switches, according to a result of the comparison, whether to successively perform a data transfer.

7. The semiconductor device according to claim 1, wherein:
the transfer mode information comprises accumulation mode information, the accumulation mode information specifying whether the mode is an accumulation mode that accumulates operation results, and
the data transfer apparatus performs, when the accumulation mode is specified, an arithmetic operation using the data information in the register and the data in the register that is read out based on the transfer source address to write back the operation result in the storage device.

8. The semiconductor device according to claim 1, wherein:
the transfer mode information comprises switch mode information, the switch mode information specifying whether to perform an operation in a switch mode that switches the transfer information set used for a data transfer, and
the data transfer apparatus switches, in the switch mode, the transfer information set used for a data transfer that is successively performed according to the data that is read out based on the transfer source address.

9. The semiconductor device according to claim 8, wherein the data transfer apparatus compares the data that is read out based on the transfer source address with the data information in the register to perform setting to cause the central processing unit to execute processing according to the comparison result.

10. The semiconductor device according to claim 1, wherein:
the transfer mode information comprises shift mode information, the shift mode information specifying whether to perform an operation in a shift mode that adjusts a data transfer source address or a data transfer destination address, and
the data transfer apparatus saves, in the shift mode, data that is read out based on the transfer source address in the data transfer function controller, re-reads out the data transfer information from the storage unit, rewrites the transfer source data in the data transfer information that is read out using the saved data, and then executes a data transfer based on each data in the register.

11. The semiconductor device according to claim 1, wherein:
the transfer mode information comprises ALM information, the ALM information specifying whether to perform an operation in an address load mode that dynamically sets a data transfer destination, and
the data transfer apparatus overwrites the data that is read out based on the transfer source address in the register as the transfer destination address of the register.

12. The semiconductor device according to claim 1, wherein:
the transfer mode information comprises CLM information, the CLM information specifying whether to perform an operation in a counter load mode that dynamically sets the transfer count data, and
the data transfer apparatus overwrites the data in the register that is read out based on the transfer source address as the transfer count data of the register.

13. The semiconductor device according to claim 1, wherein:
the transfer mode information comprises chain determination information, the chain determination information specifying whether to perform an operation in a chain determination mode to determine whether to perform next data transfer processing after data transfer processing that is being executed, and
the data transfer apparatus compares, in the chain determination mode, the data in the register that is read out based on the transfer source address with the data information in the register, and executes next data transfer processing according to the comparison.

14. The semiconductor device according to claim 1, wherein the data transfer apparatus requests the central processing unit to execute interrupt processing after data transfer processing is ended.

15. The semiconductor device according to claim 1, wherein the central processing unit sets the data transfer information according to the data transfer performed by the data transfer apparatus for the storage device.

16. The semiconductor device according to claim 1, further comprising:
a communication unit that receives data from an external device to write the reception data in the storage unit; and
an interrupt controller that starts the data transfer apparatus when the reception by the communication unit is ended,
wherein the data transfer apparatus reads out the reception data from the storage unit as the data transfer information.

17. The semiconductor device according to claim 1, wherein the central processing unit is mounted on a first chip and the data transfer apparatus is mounted on a second chip.

18. The semiconductor device according to claim 1, wherein the central processing unit and the data transfer apparatus are mounted on the same chip.

* * * * *